(12) United States Patent
Wahadaniah et al.

(10) Patent No.: US 10,619,537 B2
(45) Date of Patent: Apr. 14, 2020

(54) METHODS AND APPARATUSES FOR ENCODING AND DECODING VIDEO USING PERIODIC BUFFER DESCRIPTION

(71) Applicant: Sun Patent Trust, New York, NY (US)

(72) Inventors: Viktor Wahadaniah, Singapore (SG); Chong Soon Lim, Singapore (SG); Sue Mon Thet Naing, San Jose, CA (US); Hai Wei Sun, Singapore (SG); Takahiro Nishi, Nara (JP); Hisao Sasai, Osaka (JP); Youji Shibahara, Tokyo (JP); Toshiyasu Sugio, Osaka (JP); Kyoko Tanikawa, Osaka (JP); Toru Matsunobu, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

(21) Appl. No.: 16/542,389

(22) Filed: Aug. 16, 2019

(65) Prior Publication Data

US 2019/0368395 A1 Dec. 5, 2019

Related U.S. Application Data

(63) Continuation of application No. 16/260,758, filed on Jan. 29, 2019, now Pat. No. 10,428,706, which is a (Continued)

(51) Int. Cl.
*H04N 19/00* (2014.01)
*F01M 13/04* (2006.01)
(Continued)

(52) U.S. Cl.
CPC .......... *F01M 13/04* (2013.01); *B01D 36/001* (2013.01); *B01D 45/08* (2013.01); *H04N 19/10* (2014.11);
(Continued)

(58) Field of Classification Search
CPC ....... H04N 19/70; H04N 19/105; H04L 9/174
(Continued)

(56) References Cited

U.S. PATENT DOCUMENTS

| 7,782,943 B2 | 8/2010 | Jeon et al. |
| 8,040,949 B2 | 10/2011 | Cosman et al. |

(Continued)

FOREIGN PATENT DOCUMENTS

| CN | 1574948 | 2/2005 |
| CN | 1759610 | 4/2006 |

(Continued)

OTHER PUBLICATIONS

Rickard Sjöberg, Jonatan Samuelsson, "Absolute signaling of reference pictures", Joint Collaborative Team on Video Coding (JCT-VC) of ITU-T SG16 WP3 and ISO/IEC JTC1/SC29/WG11 6th Meeting: Torino, Jul. 18, 2011, [JCTVC-F493].

(Continued)

*Primary Examiner* — Jeffrey A Williams
(74) *Attorney, Agent, or Firm* — Wenderoth, Lind & Ponack, L.L.P.

(57) ABSTRACT

A method of encoding video including: writing a plurality of predetermined buffer descriptions into a sequence parameter set of a coded video bitstream; writing a plurality of updating parameters into a slice header of the coded video bitstream for selecting and modifying one buffer description out of the plurality of buffer descriptions; and encoding a slice into the coded video bitstream using the slice header and the modified buffer description.

1 Claim, 29 Drawing Sheets

Related U.S. Application Data continuation of application No. 15/991,330, filed on May 29, 2018, now Pat. No. 10,247,069, which is a continuation of application No. 15/860,081, filed on Jan. 2, 2018, now Pat. No. 10,015,488, which is a continuation of application No. 14/239,662, filed as application No. PCT/JP2012/005329 on Aug. 24, 2012, now Pat. No. 9,900,592.

(60) Provisional application No. 61/527,267, filed on Aug. 25, 2011.

(51) Int. Cl.
| | | |
|---|---|---|
| *H04N 19/70* | (2014.01) | |
| *H04N 19/174* | (2014.01) | |
| *H04N 19/105* | (2014.01) | |
| *B01D 36/00* | (2006.01) | |
| *B01D 45/08* | (2006.01) | |
| *H04N 19/10* | (2014.01) | |
| *B29C 65/00* | (2006.01) | |

(52) U.S. Cl.
CPC ......... *H04N 19/105* (2014.11); *H04N 19/174* (2014.11); *H04N 19/70* (2014.11); *B29C 65/00* (2013.01); *F01M 2013/0433* (2013.01); *F01M 2013/0438* (2013.01)

(58) Field of Classification Search
USPC ....................................................... 375/240
See application file for complete search history.

(56) References Cited

U.S. PATENT DOCUMENTS

| | | | |
|---|---|---|---|
| 8,615,038 | B2 | 12/2013 | Wang |
| 8,638,847 | B2 | 1/2014 | Wang |
| 8,855,208 | B2 | 10/2014 | Wahadaniah et al. |
| 8,913,665 | B2 | 12/2014 | Wahadaniah et al. |
| 8,971,406 | B2 | 3/2015 | Wahadaniah et al. |
| 9,088,799 | B2 | 7/2015 | Wahadaniah et al. |
| 9,232,233 | B2 | 1/2016 | Zhou et al. |
| 9,319,679 | B2 | 4/2016 | Ramasubramonian et al. |
| 9,432,665 | B2 | 8/2016 | Wang et al. |
| 9,584,825 | B2 | 2/2017 | Ramasubramonian et al. |
| 9,654,771 | B2 | 5/2017 | Wahadaniah et al. |
| 9,681,148 | B2 | 6/2017 | Wahadaniah et al. |
| 9,756,355 | B2 | 9/2017 | Wang et al. |
| 9,900,592 | B2 | 2/2018 | Wahadaniah et al. |
| 2003/0138043 | A1 | 7/2003 | Hannuksela |
| 2004/0255063 | A1 | 12/2004 | Crinon et al. |
| 2006/0083298 | A1 | 4/2006 | Wang et al. |
| 2006/0098738 | A1 | 5/2006 | Cosman et al. |
| 2006/0120451 | A1 | 6/2006 | Hannuksela |
| 2006/0120463 | A1 | 6/2006 | Wang |
| 2006/0120464 | A1 | 6/2006 | Hannuksela |
| 2007/0030911 | A1 | 2/2007 | Yoon |
| 2007/0110390 | A1 | 5/2007 | Toma |
| 2008/0084930 | A1 | 4/2008 | Sekiguchi et al. |
| 2009/0216964 | A1 | 8/2009 | Palladino et al. |
| 2009/0262804 | A1 | 10/2009 | Pandit et al. |
| 2010/0020870 | A1 | 1/2010 | Jeon et al. |
| 2010/0020885 | A1 | 1/2010 | Yuan et al. |
| 2010/0021143 | A1 | 1/2010 | Toma et al. |
| 2010/0034254 | A1 | 2/2010 | Wang |
| 2010/0118944 | A1 | 5/2010 | Tanaka et al. |
| 2010/0189173 | A1 | 7/2010 | Chen et al. |
| 2010/0238822 | A1 | 9/2010 | Koyabu et al. |
| 2011/0080949 | A1 | 4/2011 | Takahashi et al. |
| 2012/0224774 | A1 | 9/2012 | Lim et al. |
| 2013/0077681 | A1 | 3/2013 | Chen et al. |
| 2013/0094585 | A1 | 4/2013 | Misra et al. |
| 2013/0114687 | A1 | 5/2013 | Kim et al. |
| 2013/0215975 | A1* | 8/2013 | Samuelsson .......... H04N 19/70 375/240.25 |
| 2014/0072038 | A1 | 3/2014 | Samuelsson et al. |
| 2014/0126640 | A1 | 5/2014 | Samuelsson et al. |

FOREIGN PATENT DOCUMENTS

| | | |
|---|---|---|
| CN | 1574948 | 5/2006 |
| CN | 1941913 | 4/2007 |
| CN | 101449585 | 6/2009 |
| CN | 101529914 | 9/2009 |
| CN | 101637028 | 1/2010 |
| CN | 101637028 | 5/2010 |
| CN | 101841708 | 9/2010 |
| CN | 102036066 | 4/2011 |
| EP | 1 381 238 | 1/2004 |
| EP | 1 802 126 | 6/2007 |
| EP | 2 290 985 | 3/2011 |
| EP | 2 393 296 | 12/2011 |
| KR | 10-2009-0006094 | 1/2009 |
| KR | 10-2010-0033445 | 3/2010 |
| KR | 10-2010-0033446 | 3/2010 |
| KR | 10-2010-0033447 | 3/2010 |
| RU | 2 402 886 | 11/2007 |
| RU | 2 402 886 | 10/2010 |
| TW | 200627962 | 8/2006 |
| WO | 2005/076613 | 8/2005 |
| WO | 2007/114610 | 10/2007 |
| WO | 2008/051381 | 5/2008 |
| WO | 2010/087157 | 8/2010 |

OTHER PUBLICATIONS

Office Action issued in U.S. Appl. No. 13/605,043 dated Dec. 9, 2013.
Sjöberg et al., "Absolute signaling of reference pictures," 97 MPEG Meeting; 18/7/2011-22-7-2011; Torino; (Motion Picture Expert Group or ISO/IEC JTC1/SC29/WG11), No. m20923, Jul. 22, 2011 (Jul. 22, 2011), XP030049486.
Borgwardt, Peter, "Multi-picture Buffer Semantics for Interlaced Coding," Joint Video Team (JVT) of ISO/IEC MPEG & ITU-T VCEG, document JVT-O049, May 2002, pp. 1-18.
Office Action dated Jul. 29, 2019 and issued in Indian Patent Application No. 6555/CHENP/2013 with English translation.
Notice of Allowance dated Sep. 18, 2019 in U.S Appl. No. 15/984,470.
International Search Report dated Nov. 27, 2012 in International Application No. PCT/JP2012/005329.
International Preliminary Report on Patentability dated Dec. 24, 2013 in International Application No. PCT/JP2012/005329.
Rickard Sjöberg, Jonatan "Absolute signaling of reference pictures", Joint Collaborative Team on Video Coding (JCT-VC) of UTU-T SG16 WP3 and ISO/IEC JTC1/SC29/WG11 6th Meeting: Torino, Jul. 18, 2011, [JCTVC-F493].
ISO/IEC 14496-10 (MPEG-4 Part 10: Advanced Video Coding), Oct. 1, 2004. (ISO/IEC 14496-10 (MPEG-4, Information technology—Coding of audio-visual objects —Part 10: Advanced Video Coding), Second edition, Oct. 1, 2004, pp. 1-267).
International Search Report dated Dec. 11, 2012 in corresponding International Application No. PCT/JP2012/005608.
Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d0, Ver.1, 6th Meeting: Torino, IT, Jul. 14-22, 2011.
International Search Report dated Dec. 11, 2012 in related International Application No. PCT/JP2012/005676.
International Search Report dated Jan. 8, 2013 in related International Application No. PCT/JP2012/006235.
Preliminary Report on Patentability from WIPO in international Patent Application No. PCT/JP2012/006235, dated Feb. 4, 2014.
Office Action dated in U.S. Appl. No. 13/605,043 dated Dec. 9, 2013.
Office Action issued in U.S. Appl. No. 13/622,046 dated Sep. 23, 2013.

(56) References Cited

OTHER PUBLICATIONS

Extended European Search Report dated Jan. 5, 2015 in corresponding European patent application No. 12825464.6.
ISO/IEC 14496-10 (MPEG-4, Information technology—Coding of audio-visual objects—Part 10: Advanced Video Coding), Second edition, Oct. 1, 2004, pp. 31, 32, 35, 36, 39, 54-59, 61-67, and 69-71.
Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d0, Ver. 1, 6th Meeting: Torino, IT, Jul. 14-22, 2011, pp. 34, 35, 38-40, 60-66, and 68-70.
Rickard Sjöberg et al., "Absolute signaling of reference pictures", Joint Collaborative Team on Video Coding (JCT-VC) of ITU-T SG16 WP3 and ISO/IEC JTC1/SC29/WG11 6th Meeting: Torino, Jul. 18, 2011, [JCTVC-F493], XP003031157.
Rickard Sjöberg, et al., "Proposed changes to the HEVC Working Draft", Joint Video Team (JVT) of ISO/IEC MPEG & ITU-T VCEG (ISO/IEC JTC1/SC29/WG11 and ITU-T SG16 Q6),, [Online] No. JCTVC-F493-v8.zip Jul. 22, 2011, pp. 1-28, XP007922938.
Rickard Sjöberg et al., "Absolute signaling of Reference Pictures", Joint Video Team (JVT) of ISO/IEC MPEG & ITU -T VCEG (ISO/IEC JTC1/SC29/WG11 and ITU-T SG16 Q6),, [Online] No. JCTVC-F493 _v8.zip, Jul. 22, 2011,pp. 1-29, XP007922937.
Wiegand T et al., "WD3: Working Draft 3 of High-Efficiency Video Coding", Joint Collaborative Team on Video Coding (JCT-VC) of ITU-T SG16 WP3 and ISO/IEC JTC1/SC29/WG11, JCTVC-E603,5th Meeting: Geneva, CH, Mar. 16-23, 2011, XP030009014.
Wenger S., "Parameter set updates using conditional replacement", Joint Collaborative Team on Video Coding (JCT-VC) of ITU-T SG16 WP3 and ISO/IEC JTC1/SC29/WG11, JCTVC-E309,5th Meeting: Geneva, CH, Mar. 16-23, 2011, XP030008815.
Sullivan G et al., "Proposal on Decoded Picture Buffer Description Syntax Relating to AHG21 and JCTVC-F493", Joint Collaborative Team on Video Coding (JCT-VC) of ITU-T SG16 WP3 and ISO/IEC JTC1/SC29/WG11, JCTVC-G788,7th Meeting: Geneva, CH, Mar. 21-30, 2011, XP030110772.
Extended European Search Report dated Feb. 3, 2015 in European Patent Application No. 12829722.3.
Sjöberg et al., "Absolute signaling of reference pictures," Joint Collaborative Team on Video Coding (JCT-VC) of ITU-T SG16 WP3 and ISO/IEC JTC1/SC29/WG11, $6^{th}$ Meeting: Torino, Jul. 1, 2011, [JCTVC-F493], m20923, XP030009516.
Wahadaniah et al., "AHG21: Construction and modification of predefined reference picture sets and reference picture lists," Joint Collaborative Team on Video Coding (JCT-VC) of ITU-T SG16 WP3 and ISO/IEC JTC1/SC29/WG11, $7^{th}$ Meeting: Geneva, CH, Nov. 21-30, 2011,[JCTVC-G548], XP030110532 .
Shen et al., "Buffer Requirement Analysis and Reference Picture Marking for Temporal Scalable Video Coding," IEEE, 2007, pp. 1-7.
Extended European Search Report dated Feb. 27, 2015 in European Patent Application No. 12841179.0.
Hsu et al., "Unified Syntax of Reference Picture List Reordering," Joint Collaborative Team on Video Coding (JCT-VC) of ITU-T SG16 WP3 and ISO/IEC JTC1/SC29/WG11, $5^{th}$ Meeting: Geneva, CH, Mar. 16-23, 2011, [JCTVC-E053], XP030008559.
Extended European Search Report dated Mar. 9, 2015 in European Patent Application No. 12832999.2.

Sjöberg et al., "Absolute signaling of reference pictures," 97 MPEG Meeting; Jul. 18, 2011-Jul. 22, 2011; Torino; (Motion Picture Expert Group or ISO/IEC JTC1/SC29/WG11), No. m20923, Jul. 22, 2011 (Jul. 22, 2011), XP030049486.
Chen et al., "Support of lightweight MVC to AVC transcoding," 27. JVT Meeting; Apr. 6, 2008-Apr. 10, 2008; Geneva; (Joint Video Team of ISO/IEC JTC1/SC29/WG11 and ITU-T SG. 16), No. JVT-AA036, Apr. 28, 2008 (Apr. 28, 2008), ISSN: 0000-0091.
Hsu et al., "Unified Syntax of Reference Picture List Reordering," 96. MPEG Meeting; Mar. 21, 2011-Mar. 25, 2011; Geneva; (Motion Picture Expert Group or ISO/ISC JTC1/SC29/WG11), No. m19561, Mar. 10, 2011 (Mar. 10, 2011), XP030048128.
Borgwardt, Peter, "Multi-picture Buffer Semantics for Interlaced Coding," Joint Video Team (JVT) of ISO/IEC MPEG & ITU-T VCEG, document JVT-C049, May 2002, pp. 1-18.
Office Action dated Jul. 22, 2016 in European Patent Application No. 12841179.0.
Thomas Wiegand, et al., "Proposed editorial changes to H.263+ + Annex U", 10. VCEG, No. Q15-J-49 ITU Telecommunication Standardization Sector, Meeting May 16-18, 2000, Osaka, Japan XP030003075.
Notice of Allowance dated Jul. 27, 2016 in U.S. Appl. No. 14/603,769.
Office Action dated Aug. 23, 2016 for Chinese patent application No. 201280040892.7 with partial English Translation.
Extended European Search Report dated Sep. 28, 2016 for European patent application No. 16176917.9.
Chih-Wei Hsu et al., "Unified Syntax of Reference Picture List Reordering" Joint Collaborative Team on Video Coding (JCT-VC) of ITU-T SG16 WP3 and ISO/IEC JTC1/SC29/WG11 Document: JCTVC-E053 5th Meeting: Geneva, CH, Mar. 16-23, 2011.
Wahadaniah V et al., "AHG21: Construction and modification of predefined reference picture sets and reference picture lists", Joint Collaborative Team on Video Coding (JCT-VC) of ITU-T SG16 WP3 and ISO/IEC JTC1/SC29/WG11 7th Meeting: Geneva, CH, Nov. 21-30, 2011, [JCTVC-G548]. Date Saved Nov. 23, 2011, p. 1-p. 4.
Notice of Allowance and Notice of Allowability dated Jan. 13, 2017 in U.S. Appl. No. 15/336,075.
Office Action dated May 4, 2017 in U.S. Appl. No. 15/333,393.
U.S. Office Action dated Jun. 30, 2017 in U.S. Appl. No. 15/486,479.
Canadian Office Action dated Jul. 13, 2017 in Canadian Patent Application No. 2,845,548.
Office Action dated Sep. 18, 2017 for U.S. Appl. No. 15/473,934.
Office Action dated Aug. 5, 2016 for U.S. Appl. No. 14/239,662.
Office Action dated Apr. 21, 2017 for U.S. Appl. No. 14/239,662.
Office Action dated Nov. 16, 2017 in European Patent Application No. 12825464.6.
Office Action dated Jan. 25, 2018 in European Patent Application No. 12841179.0.
Office Action issued for Canadian Patent Application No. 2827278 dated Mar. 8, 2018.
Overview of HEVC High-Level Syntax and Reference Picture Management; Sjoberg Dec. 2012.
Notice of Allowance and Notice of Allowability issued for U.S. Appl. No. 15/486,479 dated Feb. 20, 2018.
Office Action dated Apr. 15, 2019 in Indian Application No. 6384/CHENP/2013, with English translation.
Office Action dated Jun. 28, 2019 in Indian Patent Application No. 2604/CHENP/2014 with English translation.
Office Action dated Jun. 5, 2019 in European Patent Application No. 12 841 179.0.
Office Action dated Jul. 29, 2019 in Indian Patent Application No. 655/CHENP/2013 with English translation.

\* cited by examiner

[Fig. 2]

[Fig. 4]
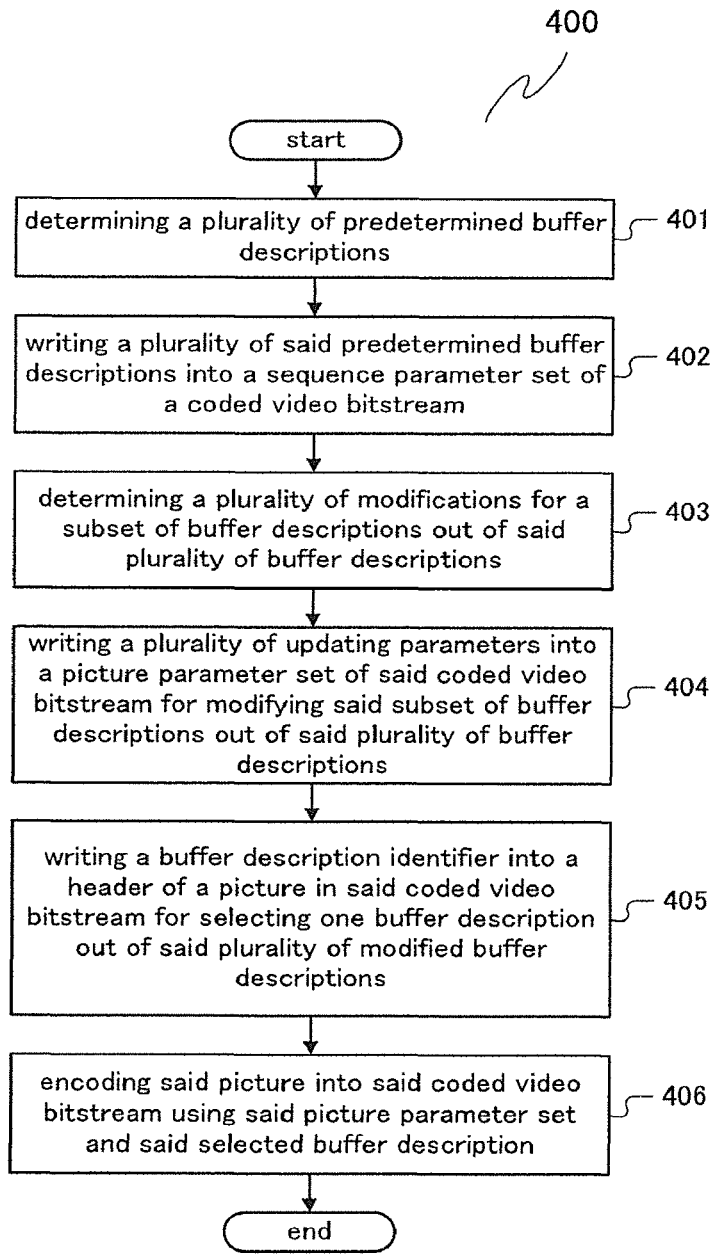
[Fig. 5A]
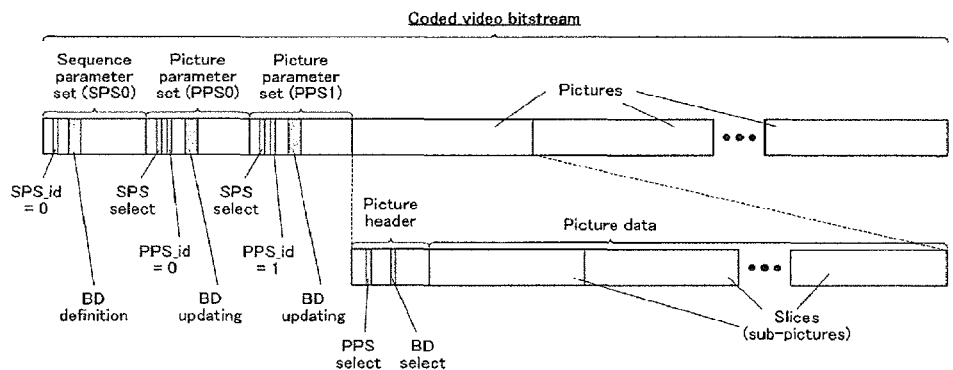

[Fig. 5B]
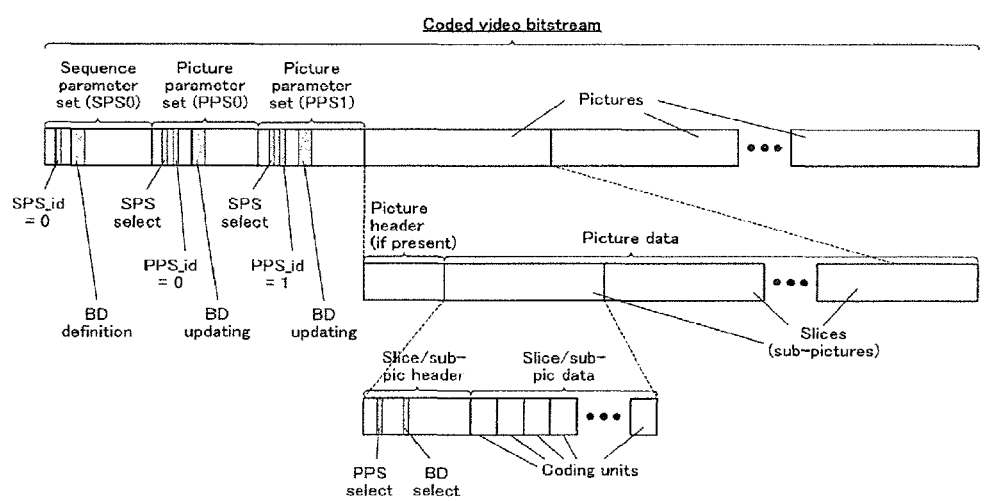

[Fig. 7]
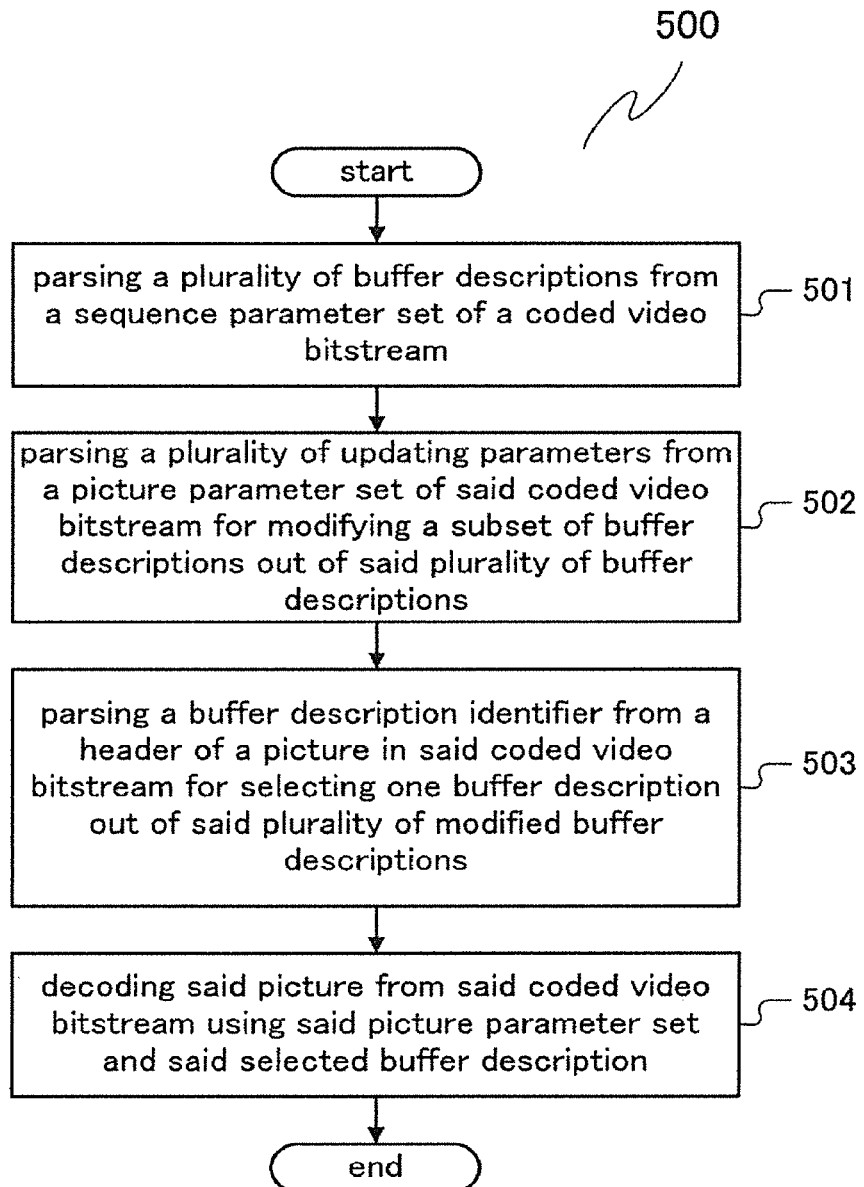

[Fig. 8]
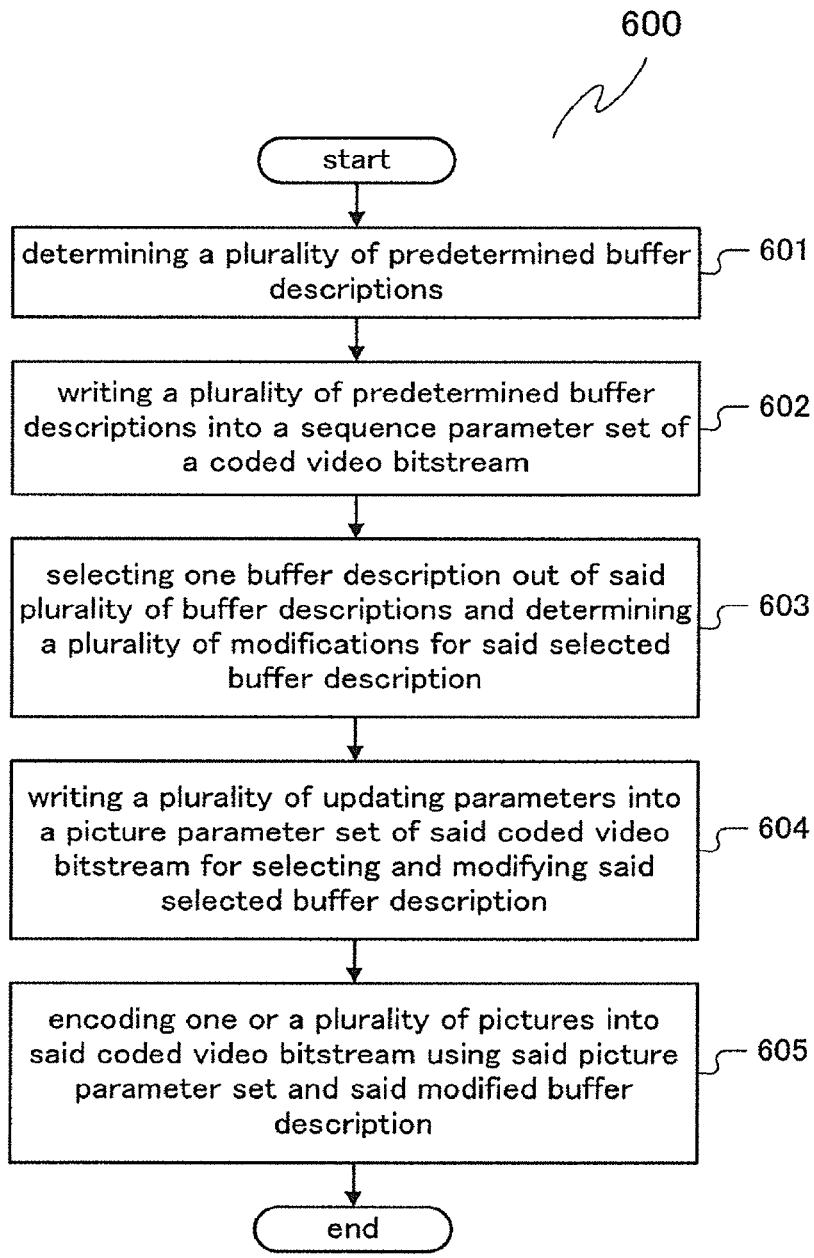
[Fig. 9A]
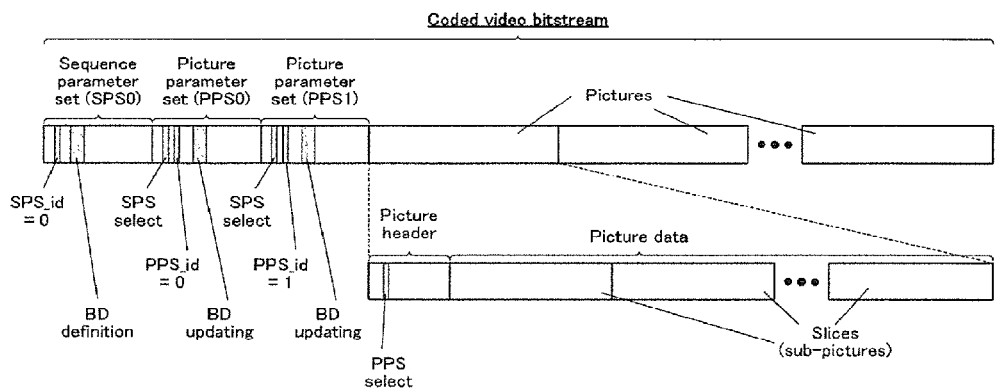

[Fig. 9B]
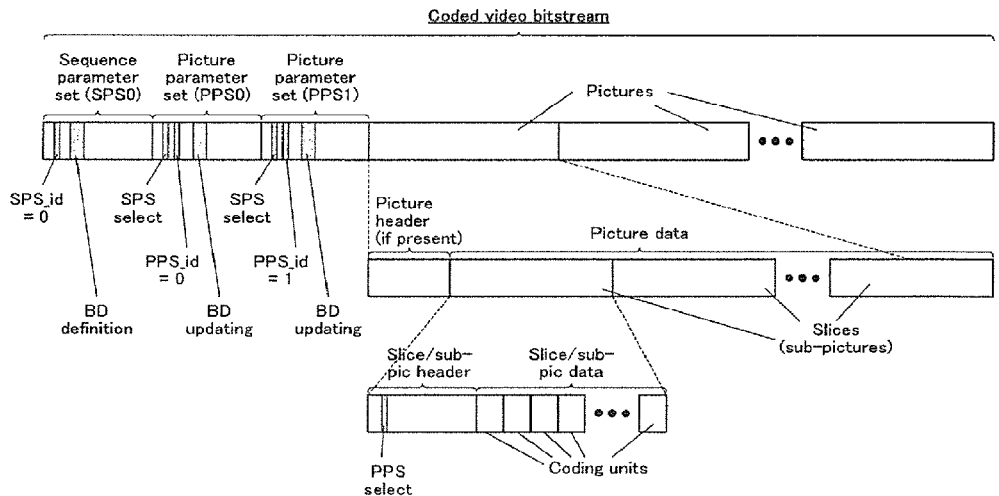
[Fig. 10]
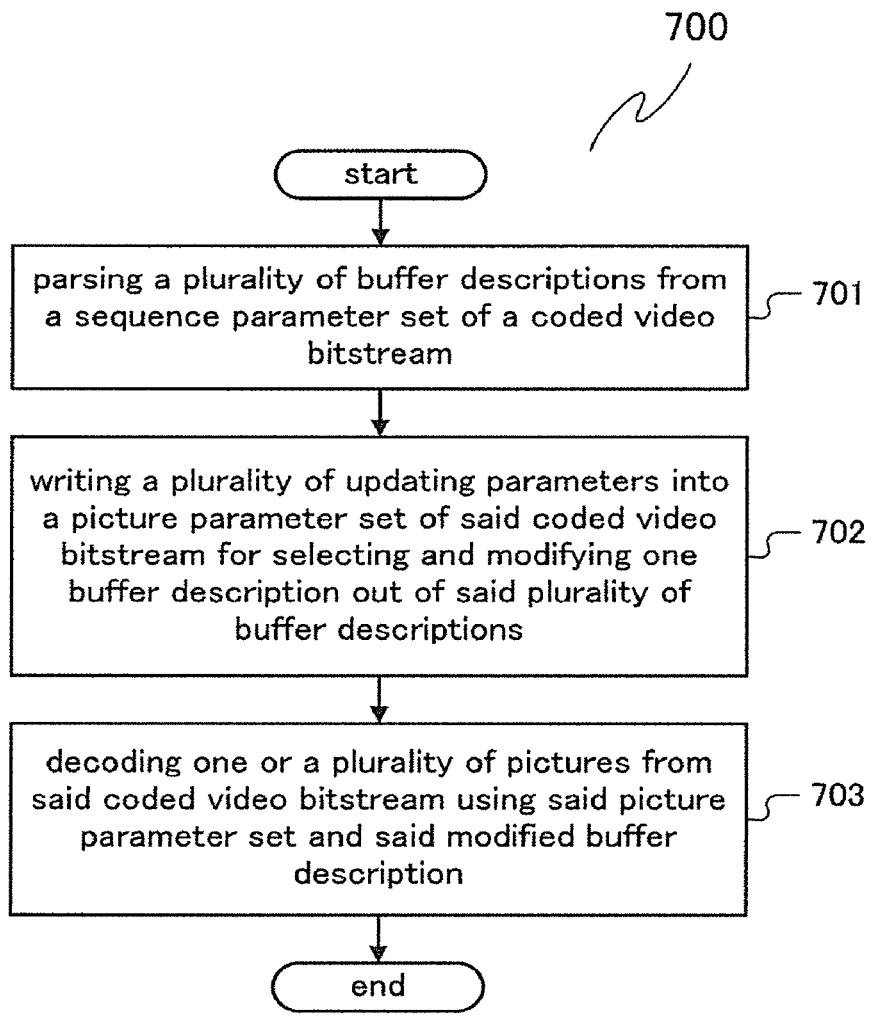

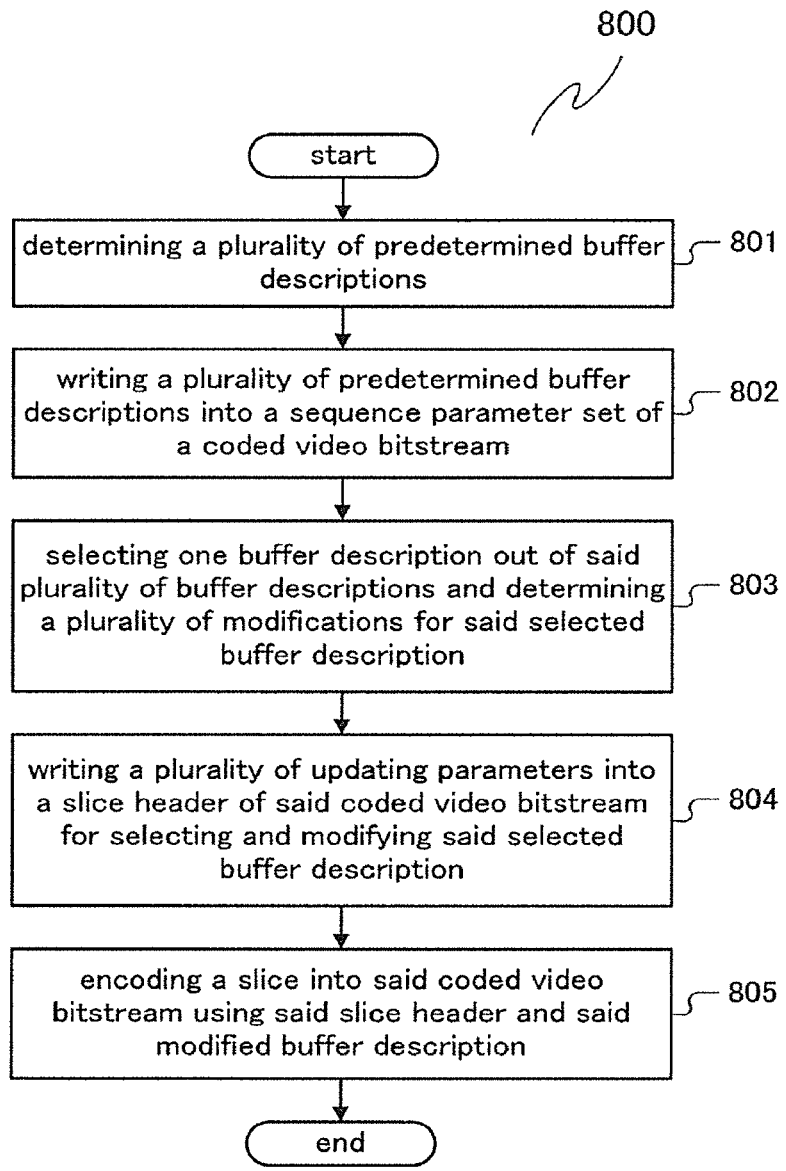

[Fig. 12B]

| slice_header( ) { |
|---|
| ... |
| short_term_ref_pic_set_sps_flag |
| if( !short_term_ref_pic_set_sps_flag ) |
| short_term_ref_pic_set( num_short_term_ref_pic_sets ) |
| else |
| short_term_ref_pic_set_idx |
| ... |

1302 (flag to indicate whether or not a selected buffer description is modified)

[Fig. 12C]

| short_term_ref_pic_set( idx ) { |
|---|
| inter_ref_pic_set_prediction_flag |
| if( inter_ref_pic_set_prediction_flag ) { |
| if( idx == num_short_term_ref_pic_sets ) |
| delta_idx_minus1 |
| delta_rps_sign |
| abs_delta_rps_minus1 |
| for( j = 0; j <= NumDeltaPocs[ RIdx ]; j++ ) { |
| used_by_curr_pic_flag[ j ] |
| if( !used_by_curr_pic_flag[ j ] ) |
| use_delta_flag[ j ] |
| } |
| } |
| else { |
| num_negative_pics |
| num_positive_pics |
| for( i = 0; i < num_negative_pics; i++ ) { |
| delta_poc_s0_minus1[ i ] |
| used_by_curr_pic_s0_flag[ i ] |
| } |
| for( i = 0; i < num_positive_pics; i++ ) { |
| delta_poc_s1_minus1[ i ] |
| used_by_curr_pic_s1_flag[ i ] |
| } |
| } |
| } |

1304 (a buffer description identifier for selecting a buffer description in SPS)

1308 (a picture identifier for reassigning a unique reference picture)

1310 (parameters to create a buffer description)

[Fig. 13]

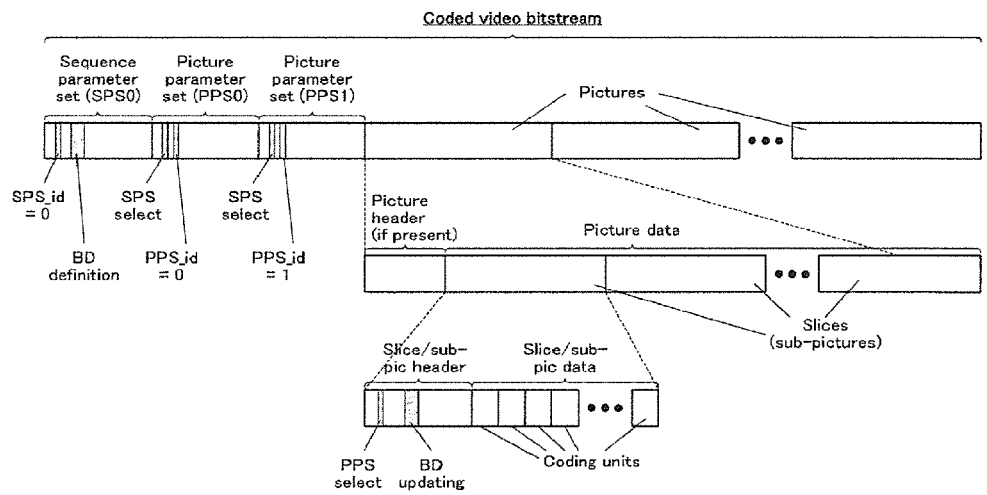

[Fig. 14]
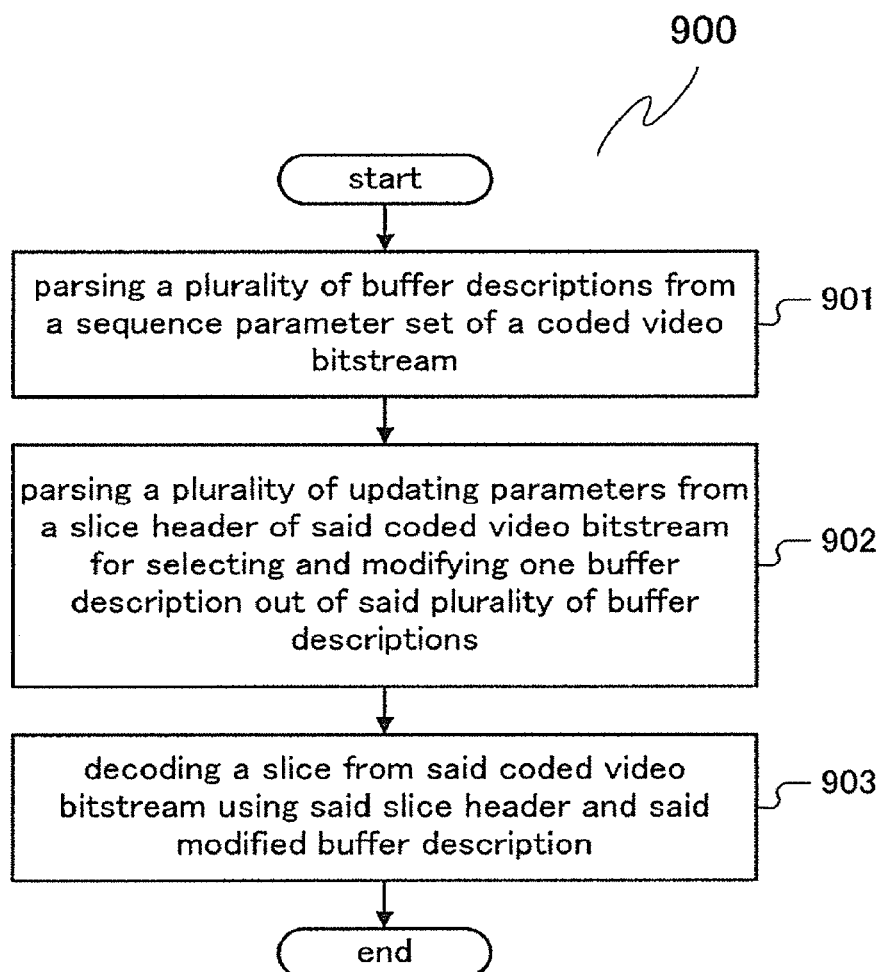

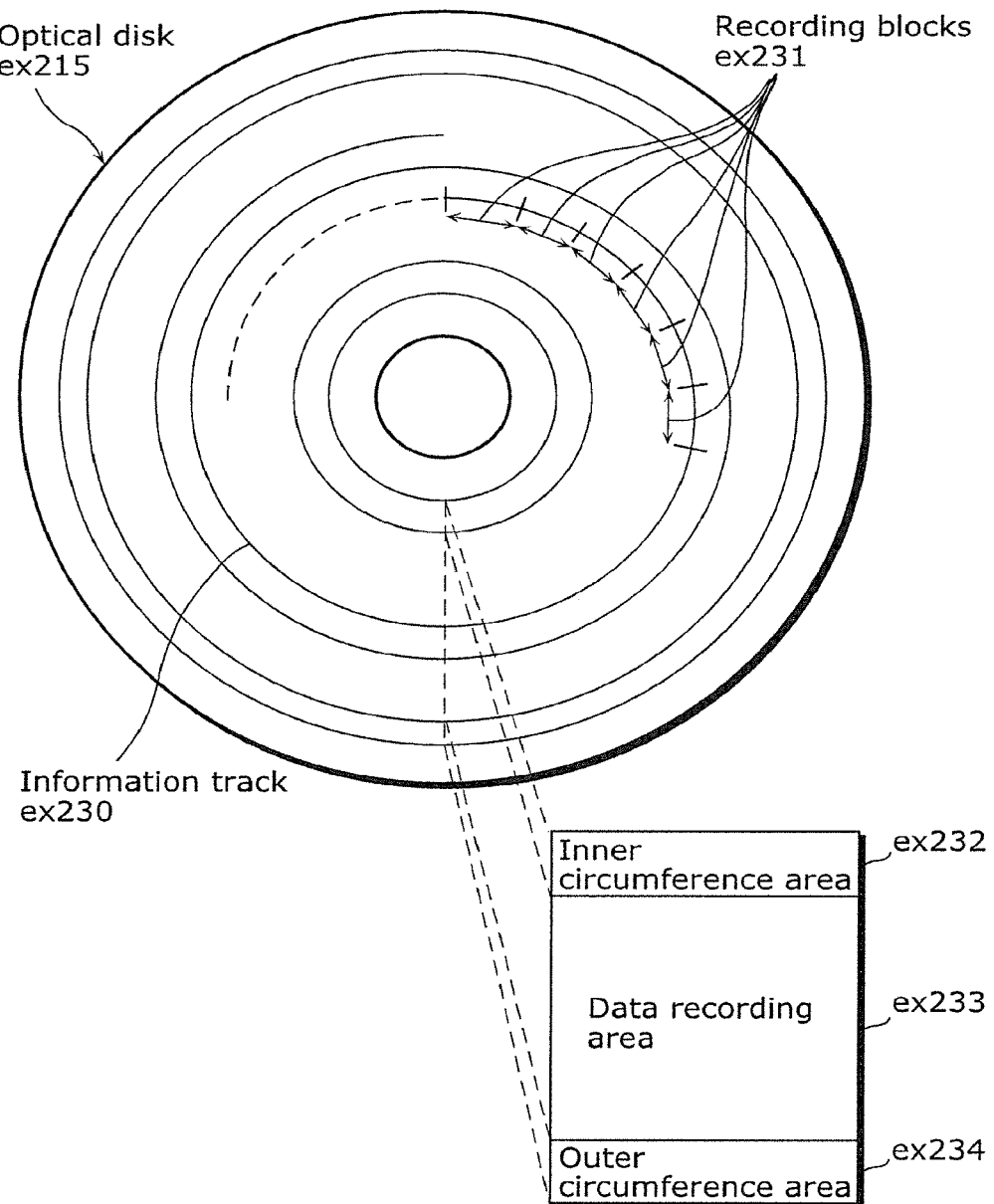
[Fig. 19]

[Fig. 20A]
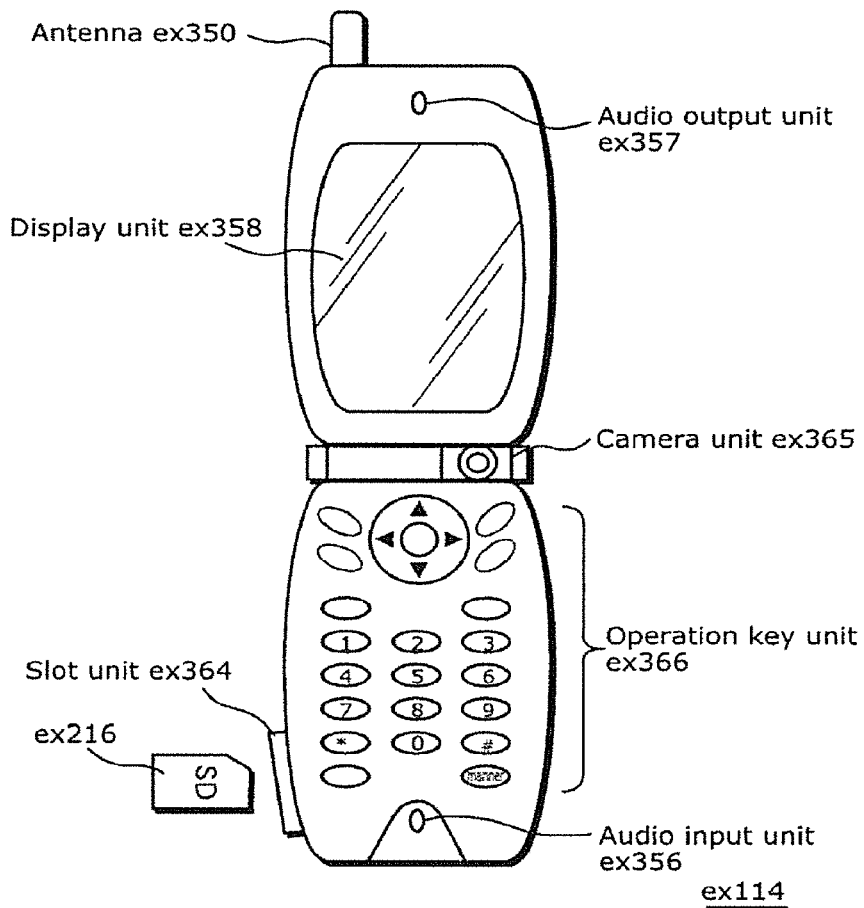
[Fig. 20B]
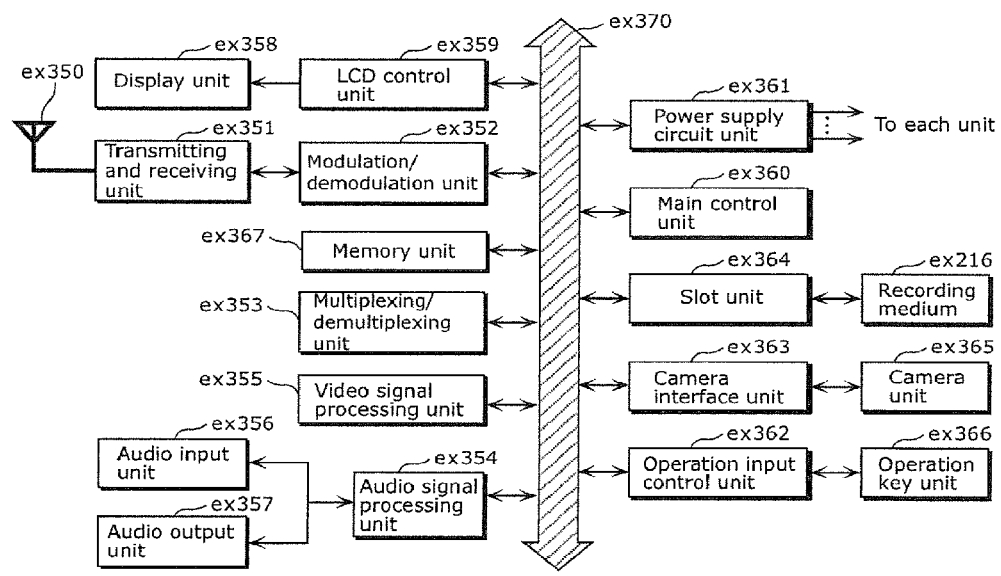

[Fig. 21]

| Video stream (PID=0x1011, Primary video) |
|---|
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

[Fig. 24]
Stream of TS packets
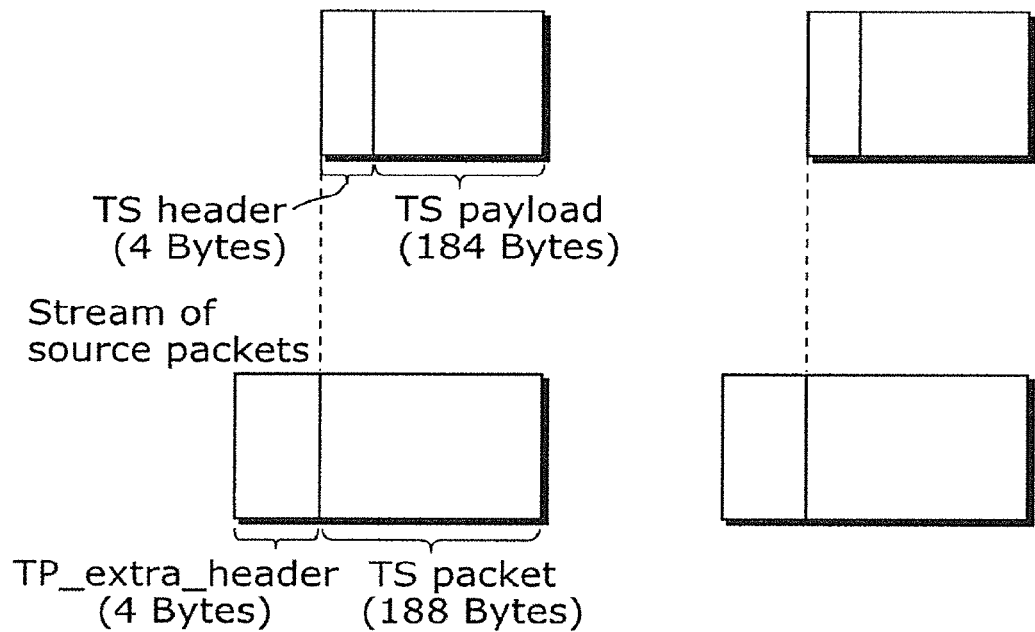
[Fig. 25]
Data structure of PMT
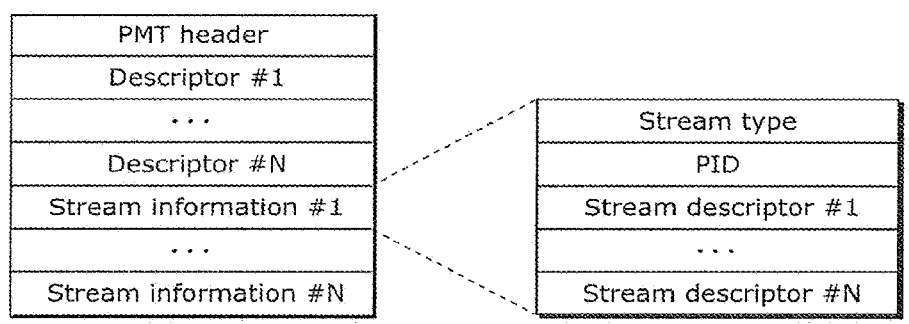

[Fig. 26]
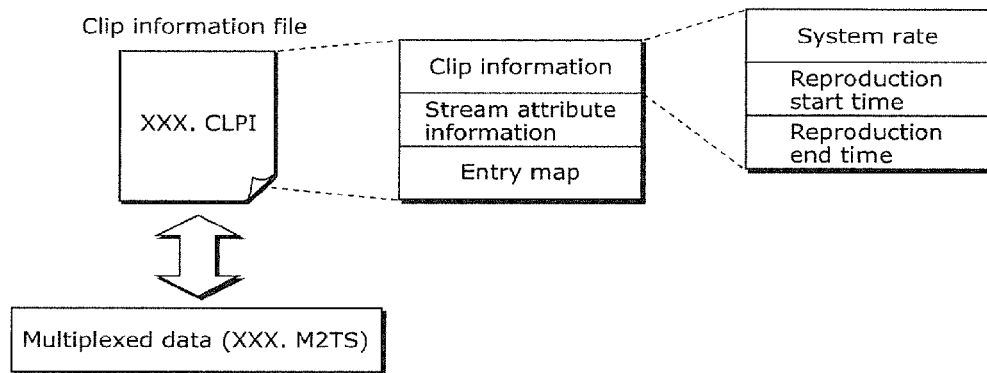
FIG. 27
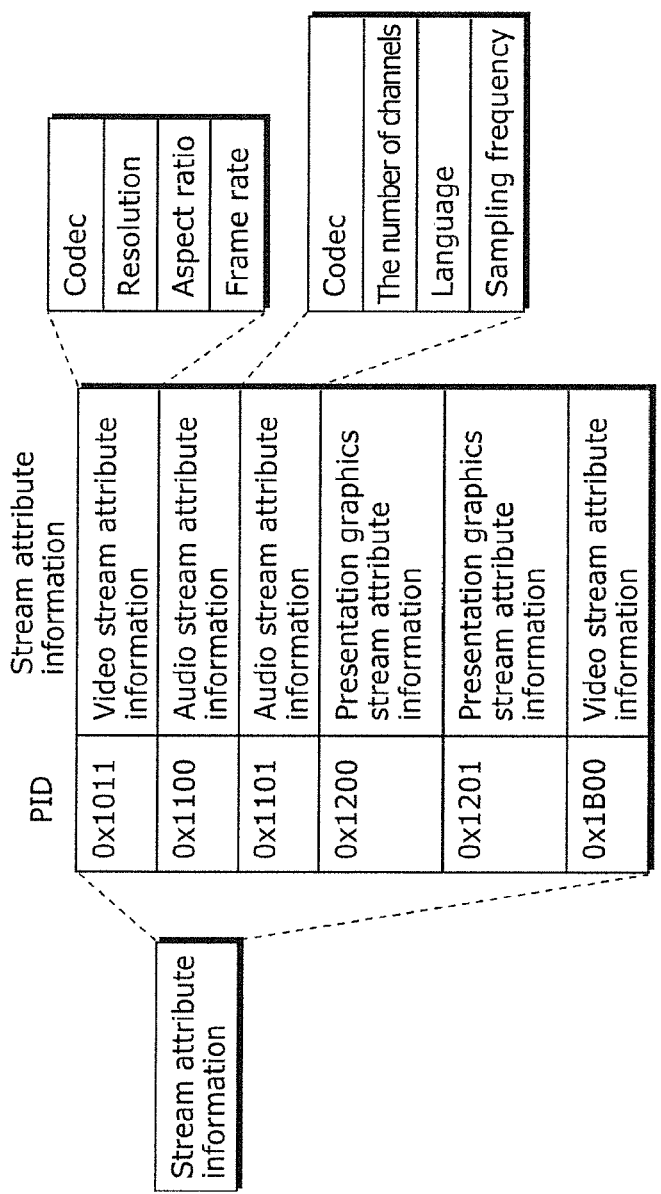

[Fig. 30]

[Fig. 32]
| Corresponding standard | Driving frequency |
|---|---|
| MPEG-4 AVC | 500 MHz |
| MPEG-2 | 350 MHz |
| ⋮ | ⋮ |
[Fig. 33A]
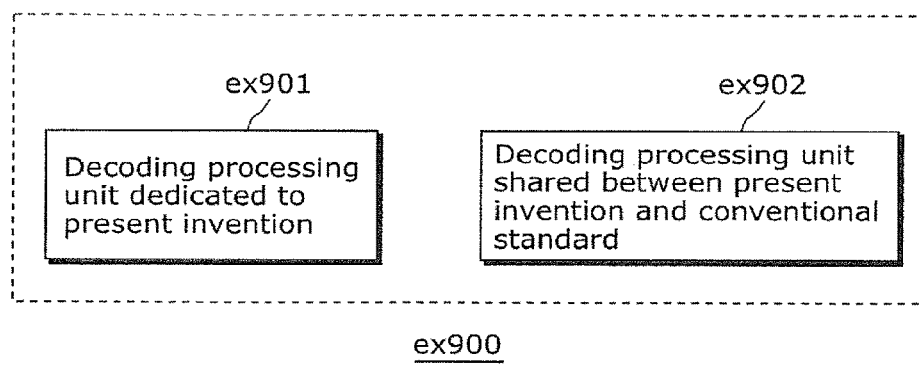

[Fig. 33B]
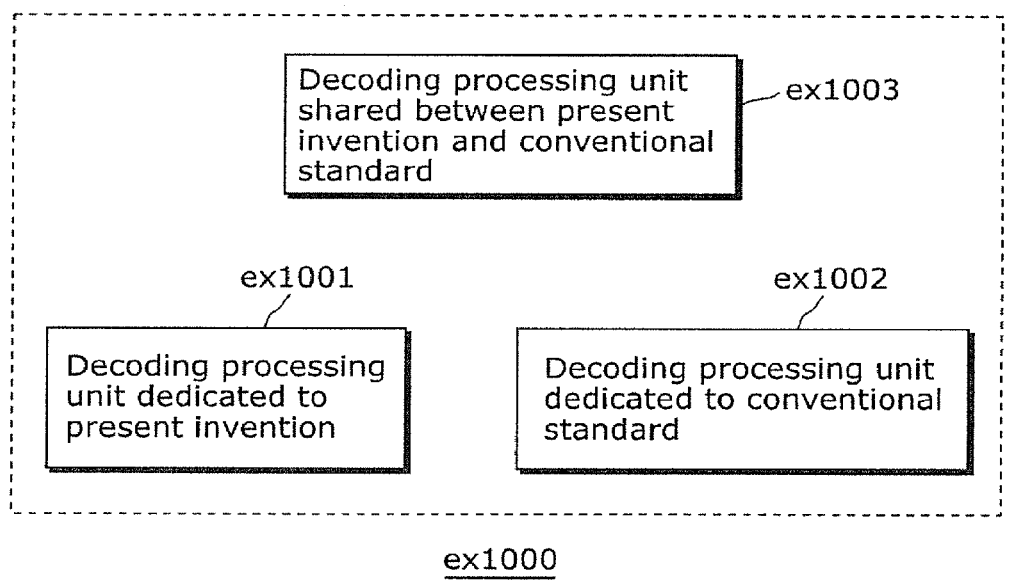

METHODS AND APPARATUSES FOR ENCODING AND DECODING VIDEO USING PERIODIC BUFFER DESCRIPTION

TECHNICAL FIELD

This invention can be used in any multimedia data coding and, more particularly, in coding of image and video contents utilizing inter-picture prediction.

BACKGROUND ART

State-of-the-art video coding schemes, such as MPEG-4 AVC/H.264 and the upcoming HEVC (High-Efficiency Video Coding), perform coding of image/video content using inter-picture prediction from previously coded/decoded reference pictures, to exploit the information redundancy across consecutive pictures in time. In MPEG-4 AVC video coding scheme, reference pictures in the decoded picture buffer (DPB) are managed either using a predefined sliding-window scheme for removing earlier pictures in coding order from the DPB, or explicitly using a number of buffer management signals in the coded video bitstream to manage and remove unused reference pictures.

Recent developments in the HEVC video coding scheme include the introduction of DPB management using buffer descriptions. Essentially, a buffer description defines the pictures that are retained/included in the DPB instead of defining the pictures to be removed from the DPB. A buffer description is a list of unique picture identifiers indicating all reference pictures that are stored in the DPB. A buffer description is activated at the start of encoding/decoding of a picture. Pictures that are not included in the active buffer description are removed from the DPB. Benefits of buffer descriptions over conventional methods include improved robustness against transmission/delivery losses and simplified handling of non-existent pictures.

Picture referencing structures are often repeated across multiple pictures in a coded video sequence. For example, a low delay coding structure may use a periodic clustering of size four as shown in FIG. 1.

In this example, the picture numbers (0 to 12) indicates both coding order and display/output order of pictures. The pictures P0, P4, P8 and P12 constitute the first temporal layer of pictures and are coded with the highest quality (for example by applying quantization least strongly). Pictures P2, P6 and P10 constitute the second temporal layer and are coded with lower quality than the first layer. Picture P1, P3, P5, P7, P9 and P11 constitutes the third temporal layer and are coded with the lowest quality. In such a periodic clustering structure, pictures the located at the same relative position within their clusters (for example P1, P5 and P9) usually use the same relative picture referencing structure. For example, P5 uses P4 and P2 as reference pictures, while P9 uses P8 and P6 as reference pictures.

In order to accommodate periodic clustering structures such as the above exemplary structure, periodic signaling of buffer descriptions was introduced. A periodic buffer description lists the reference pictures stored in the DPB by specifying the temporal distances/positions of the reference pictures relative to a target picture to be encoded/decoded. In the prior art, a periodic buffer description is signaled once in the picture parameter set (PPS), and then referred to repeatedly in the slice headers of the pictures having the same relative position within a periodic cluster. For example, a periodic buffer description specifying relative positions of {−1, −3} can be used in both P5 to specify {P4, P2} as reference pictures and by P9 to specify {P8, P6} as reference pictures.

FIG. 2 shows an example of the signaling structure of periodic buffer description in the prior art. A plurality of periodic buffer descriptions are specified in the picture parameter sets. Each PPS is identified by a unique "PPS_id" parameter. In a slice header, a "PPS select" parameter identifies the PPS referred to during encoding/decoding of the slice. In the example in FIG. 2, the PPS having PPS_id=0 is selected. A plurality of "BD updating" parameters selects a periodic buffer description out of the predefined buffer descriptions. In the example in FIG. 2, the buffer description BD1 is selected. Additionally, "BD updating" parameters also includes a buffer description modification command. The buffer modification commands assign a picture identifier to a selected buffer element within the selected buffer description. A unique/absolute picture identifier is specified here instead of a relative picture identifier. In the example in FIG. 2, the unique picture $P_G$ is assigned to the buffer element BE0 within the buffer description BD1. This modification applies only to the current target slice. To use the same modification in subsequent slices, the slice headers of those subsequent slices shall specify "BD updating" parameters accordingly.

SUMMARY OF INVENTION

Technical Problem

One problem with the prior art of periodic buffer description is that the parameters for modifying a periodic buffer description are only applied once (that is, applied in a current slice to be encoded/decoded). Consequently, the same modification needs to be signaled multiple times in order to use it more than once.

Another problem with the prior art is that the parameters for creating periodic buffer descriptions are signaled in the picture parameter set (PPS). However, a periodic picture clustering structure is usually used over a large number of pictures and often over an entire coded video sequence. Therefore, the same parameters may be signaled repeatedly in multiple picture parameter sets throughout the coded video sequence. Such repeated signaling occupies bits unnecessarily in the coded video bitstream.

Solution to Problem

To solve the above problems, the present invention introduces new methods and apparatuses for signaling periodic buffer descriptions in a coded video bitstream.

What is novel about this invention is that it provides a means to create and modify periodic buffer descriptions in a hierarchical manner, thereby achieving improved harmonization with the hierarchically structured signaling units (such as the Network Abstraction Layer units) in a coded video bitstream.

Advantageous Effects of Invention

The effect of the present invention is in the form of coding efficiency improvement of buffer description data in a coded video bitstream and in the form of design harmonization of buffer description data units with hierarchically structured signaling units in a coded video bitstream.

BRIEF DESCRIPTION OF DRAWINGS

FIG. 4 is a flowchart showing a picture encoding process according to the first embodiment of the present invention.

FIG. 5A is a syntax diagram showing the locations of the parameters for creating and modifying buffer descriptions in a coded video bitstream in example embodiments of the first embodiment of the present invention.

FIG. 5B is a syntax diagram showing the locations of the parameters for creating and modifying buffer descriptions in a coded video bitstream in example embodiments of the first embodiment of the present invention.

FIG. 7 is a flowchart showing a picture decoding process according to the first embodiment of the present invention.

FIG. 8 is a flowchart showing a picture encoding process according to the second embodiment of the present invention.

FIG. 9A is a syntax diagram showing the locations of the parameters for creating and modifying buffer descriptions in a coded video bitstream in example embodiments of the second embodiment of the present invention.

FIG. 9B is a syntax diagram showing the locations of the parameters for creating and modifying buffer descriptions in a coded video bitstream in example embodiments of the second embodiment of the present invention.

FIG. 10 is a flowchart showing a picture decoding process according to the second embodiment of the present invention.

FIG. 11 is a flowchart showing a picture encoding process according to the third embodiment of the present invention.

FIG. 12A is a tables showing the example locations of buffer descriptions in SPS.

FIG. 12B is a tables showing the example locations of updating parameters for selecting and modifying a buffer description in slice header.

FIG. 12C is a tables showing the example locations of updating parameters for selecting and modifying a buffer description in slice header.

FIG. 13 is a syntax diagram showing the locations of the parameters for creating and modifying buffer descriptions in a coded video bitstream in example embodiments of the third embodiment of the present invention.

FIG. 14 is a flowchart showing a picture decoding process according to the third embodiment of the present invention.

FIG. 19 shows an example of a configuration of a recording medium that is an optical disk.

FIG. 20A shows an example of a cellular phone.

FIG. 20B is a block diagram showing an example of a configuration of a cellular phone.

FIG. 21 illustrates a structure of multiplexed data.

FIG. 24 shows a structure of TS packets and source packets in the multiplexed data.

FIG. 25 shows a data structure of a PMT.

FIG. 26 shows an internal structure of multiplexed data information.

FIG. 27 shows an internal structure of stream attribute information.

FIG. 32 shows an example of a look-up table in which video data standards are associated with driving frequencies.

FIG. 33A is a diagram showing an example of a configuration for sharing a module of a signal processing unit.

FIG. 33B is a diagram showing another example of a configuration for sharing a module of the signal processing unit.

DESCRIPTION OF EMBODIMENTS

Hereinafter, an image decoding apparatus and an image coding apparatus according to an aspect of the present invention shall be described with reference to the drawings.

It is to be noted that the embodiments described below shows a specific example of the present invention. The numerical values, shapes, materials, structural elements, the arrangement and connection of the structural elements, steps, the processing order of the steps etc. shown in the following exemplary embodiments are mere examples. Therefore, among the structural elements in the following exemplary embodiments, structural elements not recited in any one of the independent claims defining the most generic part of the inventive concept are described as arbitrary structural elements.

Three embodiments of the present invention are described in the following. It will be apparent to those skilled in the art that combinations of the embodiments can be carried out to further increase the adaptability and flexibility of periodic buffer descriptions.

Embodiment 1

(Encoding Apparatus)

Figure 1:
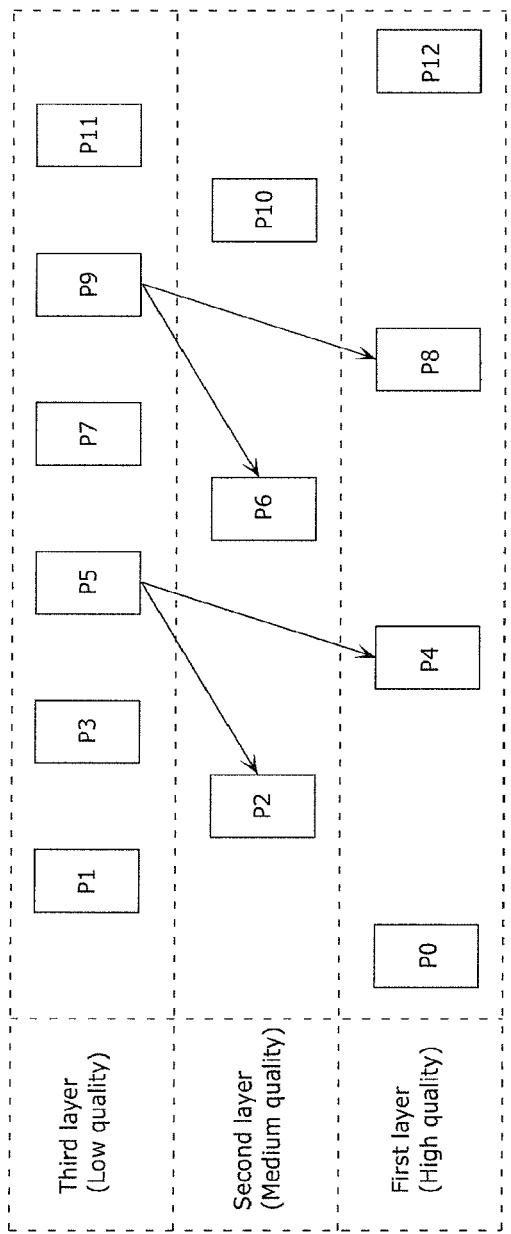
FIG. 1 shows an example of a picture referencing structure.
Figure 2:
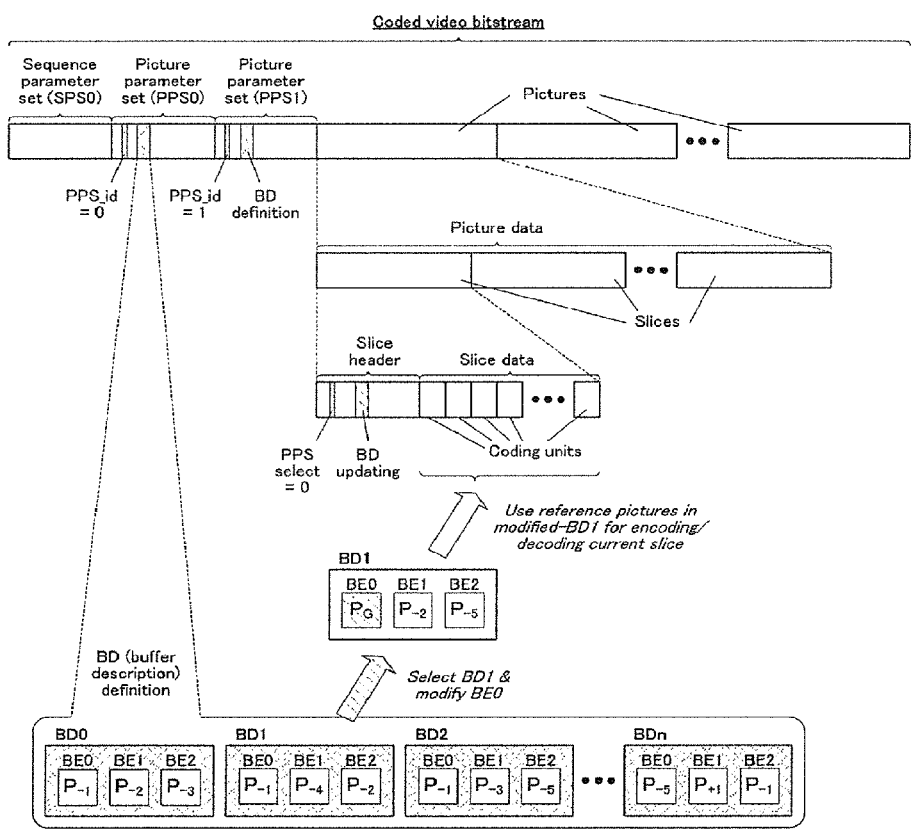
FIG. 2 is a diagram showing locations of the parameters for creating and modifying buffer descriptions in a coded video bitstream according to the prior art.
Figure 3:
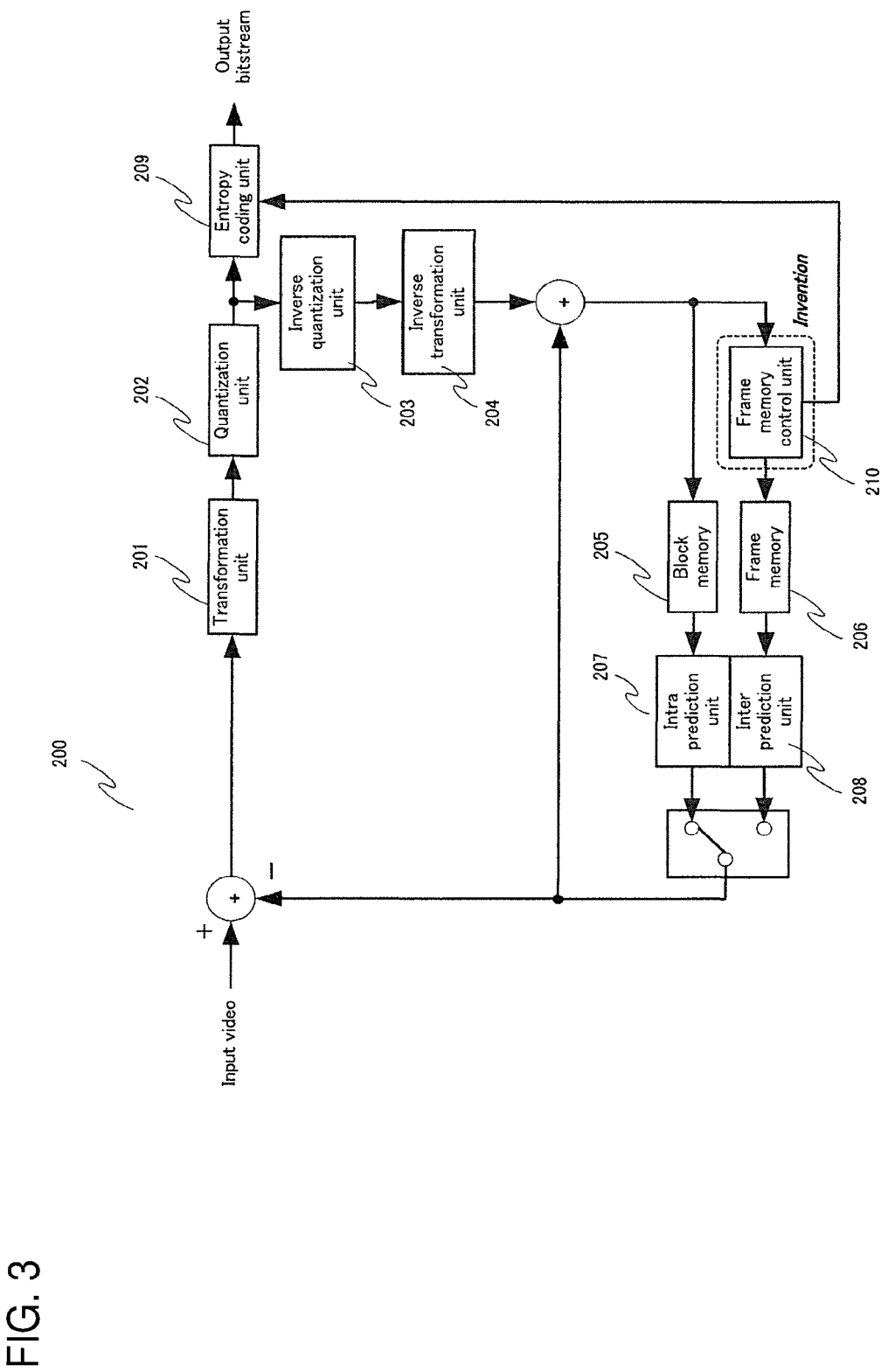
FIG. 3 is a block diagram showing a structure of video/image encoding apparatus in the present invention.

FIG. 3 is a block diagram which shows a structure of video/image encoding apparatus 200 in the present invention.

The video encoding apparatus 200 is an apparatus for encoding an input video/image bit stream on a block-by-block basis so as to generate an encoded output bit stream. As shown in FIG. 3, a transformation unit 201, a quantization unit 202, an inverse quantization unit 203, an inverse transformation unit 204, a block memory 205, a frame memory 206, an intra prediction unit 207, an inter prediction unit 208, an entropy coding unit 209, a frame memory control unit 210.

An input video is inputted to an adder, and the added value is outputted to the transformation unit 201. The transformation unit 201 transforms the added values into frequency coefficients, and outputs the resulting frequency coefficients to the quantization unit 202. The quantization unit 202 quantizes the inputted frequency coefficients, and outputs the resulting quantized values to the inverse quantization unit 203 and the entropy coding unit 209. The entropy coding unit 209 encodes the quantized values outputted from the quantization unit 202, and outputs a bit stream.

The inverse quantization unit 203 inversely quantizes the sample values outputted from the quantization unit 202, and outputs the frequency coefficients to the inverse transformation unit 204. The inverse transformation unit 204 performs inverse frequency transform on the frequency coefficients so as to transform the frequency coefficients into sample values of the bit stream, and outputs the resulting sample values to an adder. The adder adds the sample values of the bit stream outputted from the inverse transformation unit 204 to the predicted video/image values outputted from the inter/intra prediction unit 207, 208, and outputs the resulting added values to the block memory 205 or the frame memory 206 (through the frame memory control unit 210) for further prediction. The inter/intra prediction unit 207, 208 searches within reconstructed videos/images stored in the block memory 205 or the frame memory 206, and estimates a video/image area which is e.g. most similar to the input videos/images for prediction.

The frame memory control unit 210 manages the reconstructed pictures stored in the frame memory 206. It also sends frame memory control parameters to be written by the entropy coding unit 209 into the output bitstream.

(Encoding Process)

FIG. 4 is a flowchart which shows a picture encoding process 400 according to the first embodiment of the present invention.

Step 401 determines a plurality of predetermined periodic buffer descriptions to be used over a plurality of pictures in a coded video sequence. Step 402 then writes said plurality of buffer descriptions into a sequence parameter set of a coded video bitstream. Next, Step 403 determines a plurality of modifications to be performed for a subset of buffer descriptions out of said plurality of buffer descriptions. Step 404 then writes a plurality of updating parameters into a picture parameter set of said coded video bitstream for performing said modifications for said subset of buffer descriptions. During the encoding of a target picture, Step 405 writes a buffer description identifier into a header of said target picture in said coded video bitstream for selecting one buffer description out of said plurality of modified buffer descriptions. Step 406 then encodes said target picture into said coded video bitstream using said picture parameter set and said selected buffer description.

Said updating parameters written in Step 404 comprise a buffer description identifier for selecting a buffer description, a buffer element identified for selecting a buffer element within said selected buffer description, and a picture identifier for reassigning a unique reference picture to be associated with said selected buffer element within said selected buffer description. A buffer description consists of a plurality of buffer elements, where each buffer element corresponds to a unique reference picture stored in the frame memory.

Said updating parameters written in Step 404 may additionally comprise a flag/parameter to indicate that buffer description modifications are not performed and that said buffer descriptions defined in sequence parameter set remains are they are. When multiple picture parameter sets are present in said coded video bitstream, buffer description modifications specified in different picture parameter sets are independent of each other. That is, the modifications specified in a first picture parameter set are not applied when a second picture parameter set is active (in use), and the modifications specified in said active second picture parameter set are applied on top of the initial buffer descriptions defined in the sequence parameter set.

Said updating parameters written in Step 404 comprise a plurality of parameters to create/define new additional buffer descriptions in addition to the plurality of buffer descriptions defined in the sequence parameter set.

In a possible implementation of the present invention, said sequence parameter set written in Step 402 comprises a flag to indicate whether or not said plurality of buffer description is present in said sequence parameter set. When buffer descriptions are not present in said sequence parameter set, said updating parameters in said picture parameter set comprise a plurality of parameters for creating one or more buffer descriptions.

(Effect of Encoding Invention)

The effect of the present invention is in the form of coding efficiency improvement of buffer description data in a coded video bitstream and in the form of design harmonization of buffer description data units with hierarchically structured signaling units in a coded video bitstream. Using the present invention, redundant repetition of the same parameters in a coded video bitstream for creating and modifying periodic buffer descriptions are removed.

(Syntax Diagram)

FIGS. 5A and 5B are each syntax diagram which shows locations of the parameters for creating and modifying buffer descriptions in a coded video bitstream in example embodiments of the present invention.

In FIG. 5A, parameters for defining/creating a plurality of buffer descriptions are located in a sequence parameter set. A sequence parameter set is referred by a picture parameter set using a unique SPS_id parameter. Parameters for updating said plurality of buffer descriptions are located in a picture parameter set. In a picture header of a coded picture, a picture parameter set is referred using a unique PPS_id parameter. A picture consists of a picture header and one or more slices (or sub-pictures). A buffer description selecting parameter for selecting one buffer description out of the plurality of modified buffer descriptions is located in said picture header of said coded picture.

In FIG. 5B, parameters for defining/creating a plurality of buffer descriptions are located in a sequence parameter set. A sequence parameter set is referred by a picture parameter set using a unique SPS_id parameter. Parameters for updating said plurality of buffer descriptions are located in a picture parameter set. In a slice header (or sub-picture unit header) of a coded slice (or sub-picture unit), a picture parameter set is referred using a unique PPS_id parameter. A buffer description selecting parameter for selecting one out of the plurality of modified buffer descriptions is located in said slice header (or sub-picture unit header).

In possible implementations of the present invention, examples of a sub-picture unit include a tile, an entropy slice, and a group of blocks constituting a wavefront processing sub-picture partition.

(Decoding Apparatus)

Figure 6:
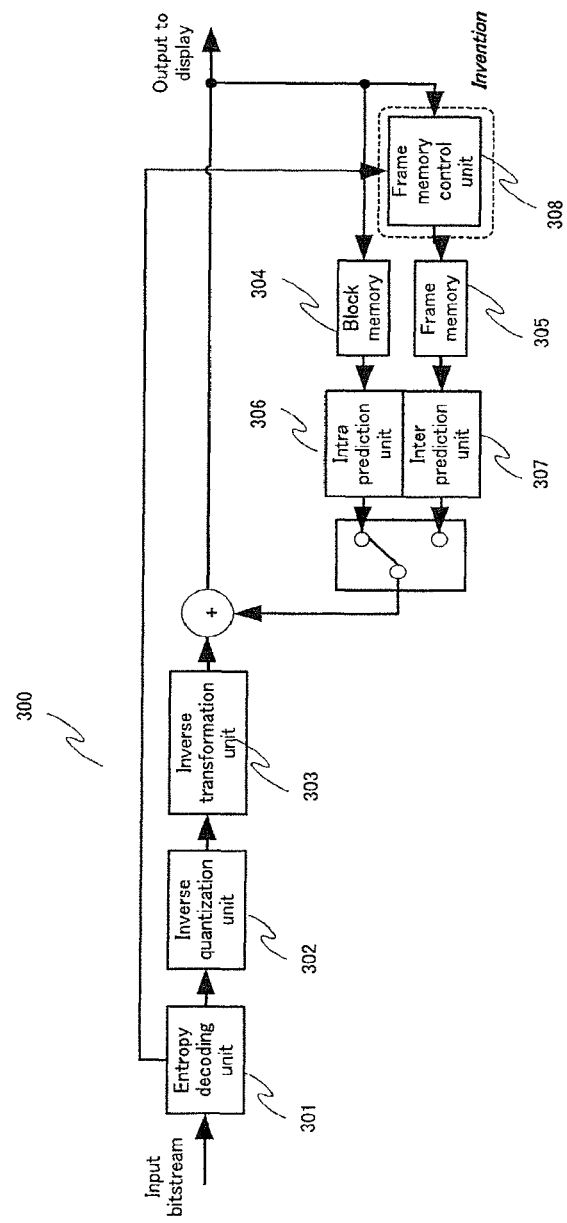
FIG. 6 is a block diagram showing a structure of video/image decoding apparatus in the present invention.

FIG. 6 is a block diagram which shows a structure of video decoding apparatus 300 in the present invention.

The video decoding apparatus 300 is an apparatus for decoding an input coded bit stream on a block-by-block basis and outputting videos/images, and comprises as shown in FIG. 6, an entropy decoding unit 301, an inverse quantization unit 302, an inverse transformation unit 303, a block memory 304, a frame memory 305, an intra prediction unit 306, an inter prediction unit 307, a frame memory control unit 308.

An input encoded bit stream is inputted to the entropy decoding unit 301. After the input encoded bit stream is inputted to the entropy decoding unit 301, the entropy decoding unit 301 decodes the input encoded bit stream, and outputs the decoded values to the inverse quantization unit 302. The inverse quantization unit 302 inversely quantizes the decoded values, and outputs the frequency coefficients to the inverse transformation unit 303. The inverse transformation unit 303 performs inverse frequency transform on the frequency coefficients to transform the frequency coefficients into sample values, and outputs the resulting pixel values to an adder. The adder adds the resulting pixel values to the predicted video/image values outputted from the intra/inter prediction unit 306, 307, and outputs the resulting values to display, and outputs the resulting values to the block memory 304 or the frame memory 305 (through the frame memory control unit 308) for further prediction. In addition, the intra/inter prediction unit 306, 307 searches within videos/images stored in the block memory 304 or frame memory 305, and estimates a video/image area which is e.g. most similar to the decoded videos/images for prediction.

The frame memory control unit 308 manages the reconstructed pictures stored in the frame memory 305. It reads frame memory control parameters from the entropy decoding unit 301 and performs memory control operations accordingly.

(Decoding Process)

FIG. 7 is a flowchart which shows a picture decoding process 500 according to the first embodiment of the present invention.

Step 501 parses a plurality of buffer descriptions from a sequence parameter set of a coded video bitstream. Next, Step 502 parses a plurality of updating parameters from a picture parameter set of said coded video bitstream for modifying a subset of buffer descriptions out of said plurality of buffer descriptions. Step 503 then parses a buffer description identifier from a header of a picture in said coded video bitstream for selecting one buffer description out of said plurality of modified buffer descriptions. Finally, Step 504 decodes said picture from said coded video bitstream using said picture parameter set and said selected buffer description.

(Effects of Decoding Invention)

The effect of the present invention is to enable the decoding of a coded video bitstream which is coded in the form of improved coding efficiency and harmonized design of buffer description data.

Embodiment 2

(Encoding Apparatus)

FIG. 3 is a block diagram which shows a structure of video/image encoding apparatus 200 in the present invention.

The video encoding apparatus 200 is an apparatus for encoding an input video/image bit stream on a block-by-block basis so as to generate an encoded output bit stream. As shown in FIG. 3, a transformation unit 201, a quantization unit 202, an inverse quantization unit 203, an inverse transformation unit 204, a block memory 205, a frame memory 206, an intra prediction unit 207, an inter prediction unit 208, an entropy coding unit 209, a frame memory control unit 210.

An input video is inputted to an adder, and the added value is outputted to the transformation unit 201. The transformation unit 201 transforms the added values into frequency coefficients, and outputs the resulting frequency coefficients to the quantization unit 202. The quantization unit 202 quantizes the inputted frequency coefficients, and outputs the resulting quantized values to the inverse quantization unit 203 and the entropy coding unit 209. The entropy coding unit 209 encodes the quantized values outputted from the quantization unit 202, and outputs a bit stream.

The inverse quantization unit 203 inversely quantizes the sample values outputted from the quantization unit 202, and outputs the frequency coefficients to the inverse transformation unit 204. The inverse transformation unit 204 performs inverse frequency transform on the frequency coefficients so as to transform the frequency coefficients into sample values of the bit stream, and outputs the resulting sample values to an adder. The adder adds the sample values of the bit stream outputted from the inverse transformation unit 204 to the predicted video/image values outputted from the inter/intra prediction unit 207, 208, and outputs the resulting added values to the block memory 205 or the frame memory 206 (through the frame memory control unit 210) for further prediction. The inter/intra prediction unit 207, 208 searches within reconstructed videos/images stored in the block memory 205 or the frame memory 206, and estimates a video/image area which is e.g. most similar to the input videos/images for prediction.

The frame memory control unit 210 manages the reconstructed pictures stored in the frame memory 206. It also sends frame memory control parameters to be written by the entropy coding unit 209 into the output bitstream.

(Encoding Process)

FIG. 8 is a flowchart which shows a picture encoding process 600 according to the second embodiment of the present invention.

Step 601 determines a plurality of predetermined periodic buffer descriptions to be used over a plurality of pictures in a coded video sequence. Step 602 then writes said plurality of buffer descriptions into a sequence parameter set of a coded video bitstream. Next, Step 603 selects one buffer description out of said plurality of buffer descriptions and determines a plurality of modifications to be performed on said selected buffer description. Step 604 then writes a plurality of updating parameters into a picture parameter set of said coded video bitstream for selecting and modifying said selected buffer description. Finally, Step 605 encodes one or a plurality of target pictures into said coded video bitstream using said picture parameter set and said modified buffer description.

Said updating parameters written into a picture parameter set in Step 604 comprise a buffer description identifier for selecting a buffer description, a buffer element identified for selecting a buffer element within said selected buffer description, and a picture identifier for reassigning a unique reference picture to be associated with said selected buffer element within said selected buffer description. A buffer description consists of a plurality of buffer elements, where each buffer element corresponds to a unique reference picture stored in the frame memory.

Said updating parameters written into a picture parameter set in Step 604 may additionally comprise a flag/parameter to indicate whether or not a selected buffer description is modified. When the flag indicates that a selected buffer description is not modified, said selected buffer description is used according to its initial definition in sequence parameter set. According to the second embodiment of the present invention, said updating parameters in said picture parameter set (Step 604) selects and modifies only one buffer description out of said plurality of buffer descriptions defined in the sequence parameter set.

When multiple picture parameter sets are present in said coded video bitstream, buffer description modifications specified in different picture parameter sets are independent of each other. That is, different picture parameter sets may select different buffer description; furthermore, the modifications specified in a first picture parameter set are not applied when a second picture parameter set is active (in use), and the modifications specified in said active second picture parameter set are applied on top of the initial buffer descriptions defined in the sequence parameter set.

In a possible implementation of the present invention, said sequence parameter set written in Step 602 comprises a flag to indicate whether or not said plurality of buffer description is present in said sequence parameter set. When buffer descriptions are not present in said sequence parameter set, said updating parameters in a picture parameter set comprise a plurality of parameters for creating a buffer description.

(Effect of Encoding Invention)

The effect of the present invention is in the form of coding efficiency improvement of buffer description data in a coded video bitstream and in the form of design harmonization of buffer description data units with hierarchically structured signaling units in a coded video bitstream. Using the present invention, redundant repetition of the same parameters in a coded video bitstream for creating and modifying periodic buffer descriptions are removed.

(Syntax Diagram)

FIGS. 9A and 9B are each a syntax diagram which shows locations of the parameters for creating and modifying buffer descriptions in a coded video bitstream in example embodiments of the present invention.

In FIG. 9A, parameters for defining/creating a plurality of buffer descriptions are located in a sequence parameter set. A sequence parameter set is referred by a picture parameter set using a unique SPS_id parameter. Parameters for selecting and modifying one buffer description out of said plurality of buffer descriptions are located in a picture parameter set. In a picture header, a picture parameter set is referred using a unique PPS_id parameter. A plurality of pictures comprising a plurality of slices (or sub-picture units) may refer to the same picture parameter set associated with a unique PPS_id value. When a picture parameter set is referred in a picture header, the buffer description that is selected and modified by said referred picture parameter set becomes active (in use).

In FIG. 9B, parameters for defining/creating a plurality of buffer descriptions are located in a sequence parameter set. A sequence parameter set is referred by a picture parameter set using a unique SPS_id parameter. Parameters for selecting and modifying one buffer description out of said plurality of buffer descriptions are located in a picture parameter set. In a slice header (or sub-picture unit header) of a coded slice (or sub-picture unit), a picture parameter set is referred using a unique PPS_id parameter. A plurality of slices may refer to the same picture parameter set associated with a unique PPS_id value. When a picture parameter set is referred in a slice header, the buffer description that is selected and modified by said referred picture parameter set becomes active (in use).

In possible implementations of the present invention, examples of a sub-picture unit include a tile, an entropy slice, and a group of blocks constituting a wavefront processing sub-picture partition.

(Decoding Apparatus)

FIG. 6 is a block diagram which shows a structure of video decoding apparatus 300 in the present invention.

The video decoding apparatus 300 is an apparatus for decoding an input coded bit stream on a block-by-block basis and outputting videos/images, and comprises as shown in FIG. 6, an entropy decoding unit 301, an inverse quantization unit 302, an inverse transformation unit 303, a block memory 304, a frame memory 305, an intra prediction unit 306, an inter prediction unit 307, a frame memory control unit 308.

An input encoded bit stream is inputted to the entropy decoding unit 301. After the input encoded bit stream is inputted to the entropy decoding unit 301, the entropy decoding unit 301 decodes the input encoded bit stream, and outputs the decoded values to the inverse quantization unit 302. The inverse quantization unit 302 inversely quantizes the decoded values, and outputs the frequency coefficients to the inverse transformation unit 303. The inverse transformation unit 303 performs inverse frequency transform on the frequency coefficients to transform the frequency coefficients into sample values, and outputs the resulting pixel values to an adder. The adder adds the resulting pixel values to the predicted video/image values outputted from the intra/inter prediction unit 306, 307, and outputs the resulting values to display, and outputs the resulting values to the block memory 304 or the frame memory 305 (through the frame memory control unit 308) for further prediction. In addition, the intra/inter prediction unit 306, 307 searches within videos/images stored in the block memory 304 or frame memory 305, and estimates a video/image area which is e.g. most similar to the decoded videos/images for prediction.

The frame memory control unit 308 manages the reconstructed pictures stored in the frame memory 305. It reads frame memory control parameters from the entropy decoding unit 301 and performs memory control operations accordingly.

(Decoding Process)

FIG. 10 is a flowchart which shows a picture decoding process 700 according to the second embodiment of the present invention.

Step 701 parses a plurality of buffer descriptions from a sequence parameter set of a coded video bitstream. Next, Step 702 parses a plurality of updating parameters from a picture parameter set of said coded video bitstream for selecting and modifying one buffer description out of said plurality of buffer descriptions. Step 703 decodes one or a plurality of pictures from said coded video bitstream using said picture parameter set and said modified buffer description.

(Effects of Decoding Invention)

The effect of the present invention is to enable the decoding of a coded video bitstream which is coded in the form of improved coding efficiency and harmonized design of buffer description data.

Embodiment 3

(Encoding Apparatus)

FIG. 3 is a block diagram which shows a structure of video/image encoding apparatus 200 in the present invention.

The video encoding apparatus 200 is an apparatus for encoding an input video/image bit stream on a block-by-block basis so as to generate an encoded output bit stream. As shown in FIG. 3, a transformation unit 201, a quantization unit 202, an inverse quantization unit 203, an inverse transformation unit 204, a block memory 205, a frame memory 206, an intra prediction unit 207, an inter prediction unit 208, an entropy coding unit 209, a frame memory control unit 210.

An input video is inputted to an adder, and the added value is outputted to the transformation unit 201. The transformation unit 201 transforms the added values into frequency coefficients, and outputs the resulting frequency coefficients to the quantization unit 202. The quantization unit 202 quantizes the inputted frequency coefficients, and outputs the resulting quantized values to the inverse quantization unit 203 and the entropy coding unit 209. The entropy coding unit 209 encodes the quantized values outputted from the quantization unit 202, and outputs a bit stream.

The inverse quantization unit 203 inversely quantizes the sample values outputted from the quantization unit 202, and outputs the frequency coefficients to the inverse transformation unit 204. The inverse transformation unit 204 performs inverse frequency transform on the frequency coefficients so as to transform the frequency coefficients into sample values of the bit stream, and outputs the resulting sample values to an adder. The adder adds the sample values of the bit stream outputted from the inverse transformation unit 204 to the predicted video/image values outputted from the inter/intra prediction unit 207, 208, and outputs the resulting added values to the block memory 205 or the frame memory 206 (through the frame memory control unit 210) for further prediction. The inter/intra prediction unit 207, 208 searches within reconstructed videos/images stored in the block memory 205 or the frame memory 206, and estimates a video/image area which is e.g. most similar to the input videos/images for prediction.

The frame memory control unit 210 manages the reconstructed pictures stored in the frame memory 206. It also sends frame memory control parameters to be written by the entropy coding unit 209 into the output bitstream.

(Encoding Process)

FIG. 11 is a flowchart which shows a picture encoding process 800 according to the third embodiment of the present invention.

Step 801 determines a plurality of predetermined periodic buffer descriptions to be used over a plurality of pictures in a coded video sequence. Step 802 then writes said plurality of buffer descriptions (e.g. 1300 of FIG. 12A) into a sequence parameter set of a coded video bitstream. A buffer description is an absolute description of the reference pictures (stored in a buffer) used in the decoding process of the current and future coded pictures. An another possible name for buffer description is reference picture set (RPS). Next, Step 803 selects one buffer description (RPS) out of said plurality of buffer descriptions (RPSs) and determines a plurality of modifications to be performed on said selected buffer description. Step 804 then writes a plurality of updating parameters (e.g. 1302, 1304 and 1308 of FIG. 12B and FIG. 12C) into a slice header of said coded video bitstream for selecting and modifying said selected buffer description. Finally, Step 805 encodes a slice into said coded video bitstream using said slice header and said modified buffer description.

Said updating parameters written into a slice header in Step 804 comprise a buffer description identifier (1304 of FIG. 12C) for selecting a buffer description, a buffer element identifier for selecting a buffer element within said selected buffer description, and a picture identifier (1308 of FIG. 12C) for reassigning a unique reference picture to be associated with said selected buffer element within said selected buffer description. A buffer description consists of a plurality of buffer elements, where each buffer element corresponds to a unique reference picture stored in the frame memory.

Said updating parameters written into a slice header in Step 804 may additionally comprise a flag/parameter (1302 of FIG. 12B) to indicate whether or not a selected buffer description is modified. When the flag indicates that a selected buffer description is not modified, said selected buffer description is used according to its initial definition in sequence parameter set. According to the third embodiment of the present invention, said updating parameters in said slice header (Step 804) selects and modifies only one buffer description out of said plurality of buffer descriptions defined in the sequence parameter set.

The buffer description modifications specified in different slice headers are independent of each other. That is, the modifications specified in a slice header only apply to the encoding/decoding of the associated slice and do not apply to any other slices; furthermore, the modifications specified in each slice header active are applied on top of the initial buffer descriptions defined in the sequence parameter set.

In a possible implementation of the present invention, said sequence parameter set written in Step 802 comprises a flag (e.g. 1312 of FIG. 12A) to indicate whether or not said plurality of buffer description is present in said sequence parameter set. When buffer descriptions are not present in said sequence parameter set, said updating parameters in a slice header comprise a plurality of parameters for creating a buffer description (e.g. 1310 of FIG. 12C).

(Effect of Encoding Invention)

The effect of the present invention is in the form of coding efficiency improvement of buffer description data in a coded video bitstream and in the form of design harmonization of buffer description data units with hierarchically structured signaling units in a coded video bitstream. Using the present invention, redundant repetition of the same parameters in a coded video bitstream for creating and modifying periodic buffer descriptions are removed.

(Syntax Diagram)

FIG. 13 is a syntax diagram which shows locations of the parameters for creating and modifying buffer descriptions in a coded video bitstream in example embodiments of the present invention.

In FIG. 13, parameters for defining/creating a plurality of buffer descriptions are located in a sequence parameter set. A sequence parameter set is referred by a picture parameter set using a unique SPS_id parameter. A picture parameter set and its associated sequence parameter set is referred by a slice header (or sub-picture unit header) of a coded slice (or sub-picture unit) using a unique PPS_id parameter. Parameters for selecting and modifying one buffer description out of said plurality of buffer descriptions (defined in the associated sequence parameter set) are located in the slice header (or sub-picture unit header). In possible implementations of the present invention, examples of a sub-picture unit include a tile, an entropy slice, and a group of blocks constituting a wavefront processing sub-picture partition.

(Decoding Apparatus)

FIG. 6 is a block diagram which shows a structure of video decoding apparatus 300 in the present invention.

The video decoding apparatus 300 is an apparatus for decoding an input coded bit stream on a block-by-block basis and outputting videos/images, and comprises as shown in FIG. 6, an entropy decoding unit 301, an inverse quantization unit 302, an inverse transformation unit 303, a block memory 304, a frame memory 305, an intra prediction unit 306, an inter prediction unit 307, a frame memory control unit 308.

An input encoded bit stream is inputted to the entropy decoding unit 301. After the input encoded bit stream is inputted to the entropy decoding unit 301, the entropy decoding unit 301 decodes the input encoded bit stream, and outputs the decoded values to the inverse quantization unit 302. The inverse quantization unit 302 inversely quantizes the decoded values, and outputs the frequency coefficients to the inverse transformation unit 303. The inverse transformation unit 303 performs inverse frequency transform on the frequency coefficients to transform the frequency coefficients into sample values, and outputs the resulting pixel values to an adder. The adder adds the resulting pixel values to the predicted video/image values outputted from the intra/inter prediction unit 306, 307, and outputs the resulting values to display, and outputs the resulting values to the block memory 304 or the frame memory 305 (through the frame memory control unit 308) for further prediction. In addition, the intra/inter prediction unit 306, 307 searches within videos/images stored in the block memory 304 or frame memory 305, and estimates a video/image area which is e.g. most similar to the decoded videos/images for prediction.

The frame memory control unit 308 manages the reconstructed pictures stored in the frame memory 305. It reads frame memory control parameters from the entropy decoding unit 301 and performs memory control operations accordingly.

(Decoding Process)

FIG. 14 is a flowchart which shows a picture decoding process 700 according to the third embodiment of the present invention.

Step 901 parses a plurality of buffer descriptions (e.g. 1300 of FIG. 12A) from a sequence parameter set of a coded video bitstream. A buffer description is an absolute description of the reference pictures (stored in a buffer) used in the decoding process of the current and future coded pictures. An another possible name for buffer description is reference picture set (RPS). Next, Step 902 parses a plurality of updating parameters (e.g. 1302, 1304 and 1308 of FIG. 12B and FIG. 12C) from a slice header of said coded video bitstream for selecting and modifying one buffer description out of said plurality of buffer descriptions. Step 903 decodes a slice from said coded video bitstream using said slice header and said modified buffer description.

Said updating parameters parsed from a slice header in Step 902 comprise a buffer description identifier (e.g. 1304 of FIG. 12C) for selecting a buffer description, a buffer element identifier for selecting a buffer element within said selected buffer description, and a picture identifier (e.g. 1308 of FIG. 12C) for reassigning a unique reference picture to be associated with said selected buffer element within said selected buffer description. A buffer description consists of a plurality of buffer elements, where each buffer element corresponds to a unique reference picture stored in the picture memory.

Said updating parameters written into a slice header in Step 902 may additionally comprise a flag/parameter (e.g. 1302 of FIG. 12B) to indicate whether or not a selected buffer description is modified. When the flag indicates that a selected buffer description is not modified, said selected buffer description is used according to its initial definition in sequence parameter set. According to the third embodiment of the present invention, said updating parameters in said slice header (Step 902) selects and modifies only one buffer description out of said plurality of buffer descriptions defined in the sequence parameter set.

The buffer description modifications specified in different slice headers are independent of each other. That is, the modifications specified in a slice header only apply to the encoding/decoding of the associated slice and do not apply to any other slices; furthermore, the modifications specified in each slice header active are applied on top of the initial buffer descriptions defined in the sequence parameter set.

In a possible implementation of the present invention, said sequence parameter set parsed in Step 901 comprises a flag (e.g. 1312 of FIG. 12A) to indicate whether or not said plurality of buffer description is present in said sequence parameter set. When buffer descriptions are not present in said sequence parameter set, said updating parameters in a slice header comprise a plurality of parameters for creating a buffer description (e.g. 1310 of FIG. 12C).

(Effects of Decoding Invention)

The effect of the present invention is to enable the decoding of a coded video bitstream which is coded in the form of improved coding efficiency and harmonized design of buffer description data.

As above, a method of encoding video according to an aspect of the present invention including: writing a plurality of predetermined buffer descriptions into a sequence parameter set of a coded video bitstream; writing a plurality of updating parameters into a picture parameter set of said coded video bitstream for modifying a subset of buffer descriptions out of said plurality of buffer descriptions; writing a buffer description identifier into a header of a picture in said coded video bitstream for selecting one buffer description out of said plurality of modified buffer descriptions; encoding said picture into said coded video bitstream using said picture parameter set and said selected buffer description.

Furthermore, a method of decoding video including: parsing a plurality of buffer descriptions from a sequence parameter set of a coded video bitstream; parsing a plurality of updating parameters from a picture parameter set of said coded video bitstream for modifying a subset of buffer descriptions out of said plurality of buffer descriptions; parsing a buffer description identifier from a header of a picture in said coded video bitstream for selecting one buffer description out of said plurality of modified buffer descriptions; decoding said picture from said coded video bitstream using said picture parameter set and said selected buffer description.

Furthermore, a method of encoding video including: writing a plurality of predetermined buffer descriptions into a sequence parameter set of a coded video bitstream; writing a plurality of updating parameters into a picture parameter set of said coded video bitstream for selecting and modifying one buffer description out of said plurality of buffer descriptions; encoding one or a plurality of pictures into said coded video bitstream using said picture parameter set and said modified buffer description.

Furthermore, a method of decoding video including: parsing a plurality of buffer descriptions from a sequence parameter set of a coded video bitstream; writing a plurality of updating parameters into a picture parameter set of said coded video bitstream for selecting and modifying one buffer description out of said plurality of buffer descriptions; decoding one or a plurality of pictures from said coded video bitstream using said picture parameter set and said modified buffer description.

Furthermore, a method of encoding video including: writing a plurality of predetermined buffer descriptions into a sequence parameter set of a coded video bitstream; writing a plurality of updating parameters into a slice header of said coded video bitstream for selecting and modifying one buffer description out of said plurality of buffer descriptions; encoding a slice into said coded video bitstream using said slice header and said modified buffer description.

Furthermore, a method of decoding video including: parsing a plurality of buffer descriptions from a sequence parameter set of a coded video bitstream; parsing a plurality of updating parameters from a slice header of said coded video bitstream for selecting and modifying one buffer description out of said plurality of buffer descriptions; decoding a slice from said coded video bitstream using said slice header and said modified buffer description.

Furthermore, the method of encoding or decoding video, whereas said updating parameters include: a buffer description identifier for selecting a buffer description; a buffer element identified for selecting a buffer element within said selected buffer description, whereas a buffer element corresponds to a unique reference picture; a picture identifier for reassigning a unique reference picture to be associated with said selected buffer element within said selected buffer description.

Furthermore, the method of encoding or decoding video, whereas said updating parameters indicate that none of said buffer descriptions written in said sequence parameter set is modified.

Furthermore, the method of encoding or decoding video, whereas said updating parameters include the parameters for creating an additional plurality of buffer descriptions in addition to said plurality of buffer descriptions written in said sequence parameter set.

Furthermore, the method for encoding or decoding video, whereas said picture parameter set includes a flag to indicate whether or not a selected buffer description is modified, wherein when said flag indicates that a selected buffer description is not modified, said updating parameters selects one buffer description out of said plurality of buffer descriptions but does not modify said selected buffer description.

Furthermore, the method for encoding or decoding video, whereas said slice header includes a flag to indicate whether or not a selected buffer description is modified, wherein when said flag indicates that a selected buffer description is not modified, said updating parameters selects one buffer description out of said plurality of buffer descriptions but does not modify said selected buffer description.

Furthermore, the method of encoding or decoding video, whereas said sequence parameter set includes a flag to indicate whether or not buffer descriptions are present in said sequence parameter set.

Furthermore, the method of encoding or decoding video, wherein when buffer descriptions are not present in said sequence parameter set as indicated by said flag, said updating parameters in said picture parameter set include the parameters for creating one or more buffer descriptions.

Furthermore, the method of encoding or decoding video, wherein when buffer descriptions are not present in said sequence parameter set as indicated by said flag, said updating parameters in said picture parameter set include the parameters for creating a buffer description.

Furthermore, the method of encoding or decoding video, wherein when buffer descriptions are not present in said sequence parameter set as indicated by said flag, said updating parameters in said slice header include the parameters for creating a buffer description.

Furthermore, a video bit stream encoding apparatus including: a writing unit operable to write a plurality of predetermined buffer descriptions into a sequence parameter set of a coded video bitstream; a writing unit operable to write a plurality of updating parameters into a picture parameter set of said coded video bitstream for modifying a subset of buffer descriptions out of said plurality of buffer descriptions; a writing unit operable to write a buffer description identifier into a header of a picture in said coded video bitstream for selecting one buffer description out of said plurality of modified buffer descriptions; an encoding unit operable to encode said picture into said coded video bitstream using said picture parameter set and said selected buffer description.

Furthermore, a video bit stream decoding apparatus including: a parsing unit operable to parse a plurality of buffer descriptions from a sequence parameter set of a coded video bitstream; a parsing unit operable to parse a plurality of updating parameters from a picture parameter set of said coded video bitstream for modifying a subset of buffer descriptions out of said plurality of buffer descriptions; a parsing unit operable to parse a buffer description identifier from a header of a picture in said coded video bitstream for selecting one buffer description out of said plurality of modified buffer descriptions; a decoding unit operable to decode said picture from said coded video bitstream using said picture parameter set and said selected buffer description.

Furthermore, a video bit stream encoding apparatus including: a writing unit operable to write a plurality of predetermined buffer descriptions into a sequence parameter set of a coded video bitstream; a writing unit operable to write a plurality of updating parameters into a picture parameter set of said coded video bitstream for selecting and modifying one buffer description out of said plurality of buffer descriptions; an encoding unit operable to encode one or a plurality of pictures into said coded video bitstream using said picture parameter set and said modified buffer description.

Furthermore, a video bit stream decoding apparatus including: a parsing unit operable to parse a plurality of buffer descriptions from a sequence parameter set of a coded video bitstream; a writing unit operable to write a plurality of updating parameters into a picture parameter set of said coded video bitstream for selecting and modifying one buffer description out of said plurality of buffer descriptions; a decoding unit operable to decode one or a plurality of pictures from said coded video bitstream using said picture parameter set and said modified buffer description.

Furthermore, a video bit stream encoding apparatus including: a writing unit operable to write a plurality of predetermined buffer descriptions into a sequence parameter set of a coded video bitstream; a writing unit operable to write a plurality of updating parameters into a slice header of said coded video bitstream for selecting and modifying one buffer description out of said plurality of buffer descriptions; an encoding unit operable to encode a slice into said coded video bitstream using said slice header and said modified buffer description.

Furthermore, a video bit stream decoding apparatus including: a parsing unit operable to parse a plurality of buffer descriptions from a sequence parameter set of a coded video bitstream; a parsing unit operable to parse a plurality of updating parameters from a slice header of said coded video bitstream for selecting and modifying one buffer description out of said plurality of buffer descriptions; a decoding unit operable to decode a slice from said coded video bitstream using said slice header and said modified buffer description.

Furthermore, the video bit stream encoding or decoding apparatuses, whereas said updating parameters include: a buffer description identifier for selecting a buffer description; a buffer element identified for selecting a buffer element within said selected buffer description, whereas a buffer element corresponds to a unique reference picture; a picture identifier for reassigning a unique reference picture to be associated with said selected buffer element within said selected buffer description.

Furthermore, the video bit stream encoding or decoding apparatuses, whereas said updating parameters indicate that none of said buffer descriptions written in said sequence parameter set is modified.

Furthermore, the video bit stream encoding or decoding apparatuses, whereas said updating parameters include the parameters for creating an additional plurality of buffer descriptions in addition to said plurality of buffer descriptions written in said sequence parameter set.

Furthermore, the video bit stream encoding or decoding apparatuses, whereas said picture parameter set includes a flag to indicate whether or not a selected buffer description is modified, wherein when said flag indicates that a selected buffer description is not modified, said updating parameters selects one buffer description out of said plurality of buffer descriptions but does not modify said selected buffer description.

Furthermore, the video bit stream encoding or decoding apparatuses, whereas said slice header includes a flag to indicate whether or not a selected buffer description is modified, wherein when said flag indicates that a selected buffer description is not modified, said updating parameters selects one buffer description out of said plurality of buffer descriptions but does not modify said selected buffer description.

Furthermore, the video bit stream encoding or decoding apparatuses, whereas said sequence parameter set includes a flag to indicate whether or not buffer descriptions are present in said sequence parameter set.

Furthermore, the video bit stream encoding or decoding apparatuses, wherein when buffer descriptions are not present in said sequence parameter set as indicated by said flag, said updating parameters in said picture parameter set include the parameters for creating one or more buffer descriptions.

Furthermore, the video bit stream encoding or decoding apparatuses, wherein when buffer descriptions are not present in said sequence parameter set as indicated by said flag, said updating parameters in said picture parameter set include the parameters for creating a buffer description.

Furthermore, the video bit stream encoding or decoding apparatuses, wherein when buffer descriptions are not present in said sequence parameter set as indicated by said flag, said updating parameters in said slice header include the parameters for creating a buffer description.

It should be noted that these general and specific aspects may be implemented using a system, a method, an integrated circuit, a computer program, or a recording medium, or any combination of systems, methods, integrated circuits, computer programs, or recording media.

Embodiment 4

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 15:
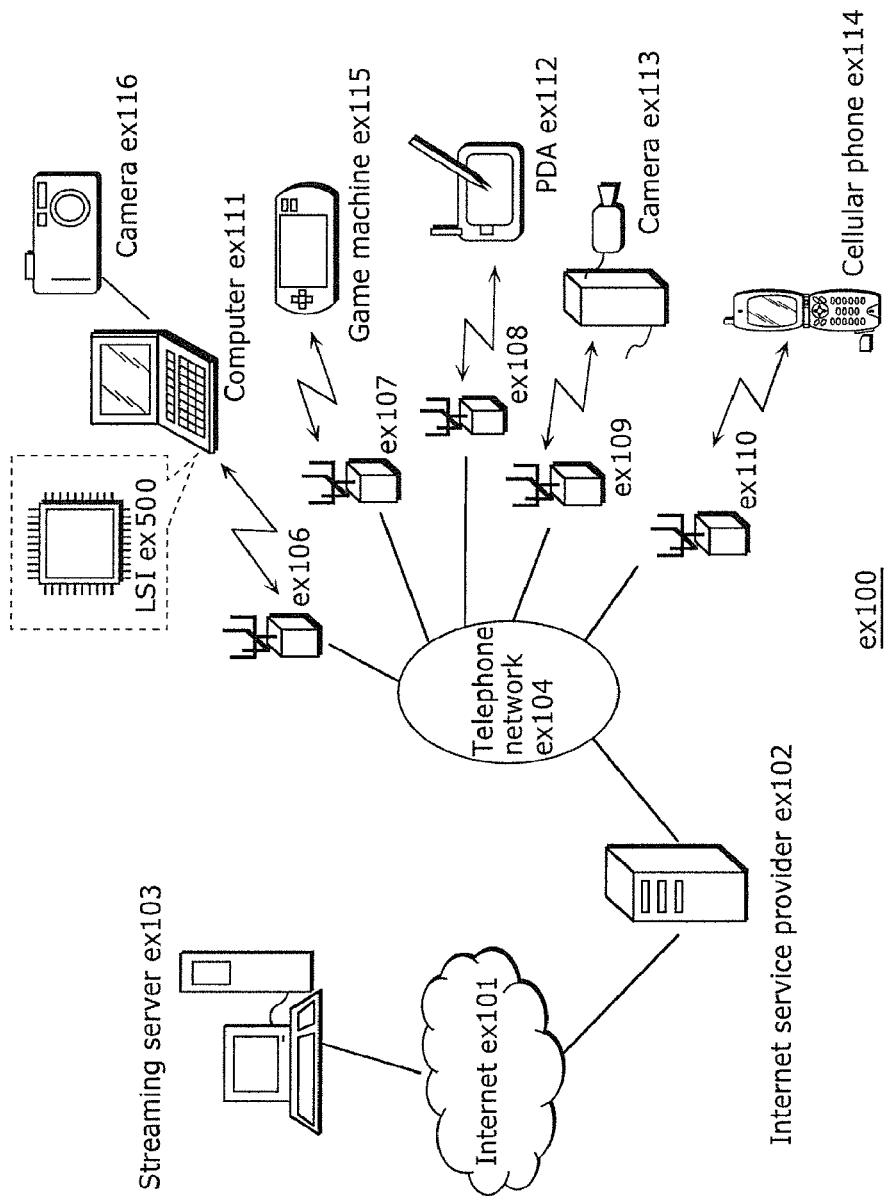
FIG. 15 shows an overall configuration of a content providing system for implementing content distribution services.

FIG. 15 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 15, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present invention), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present invention).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 16:
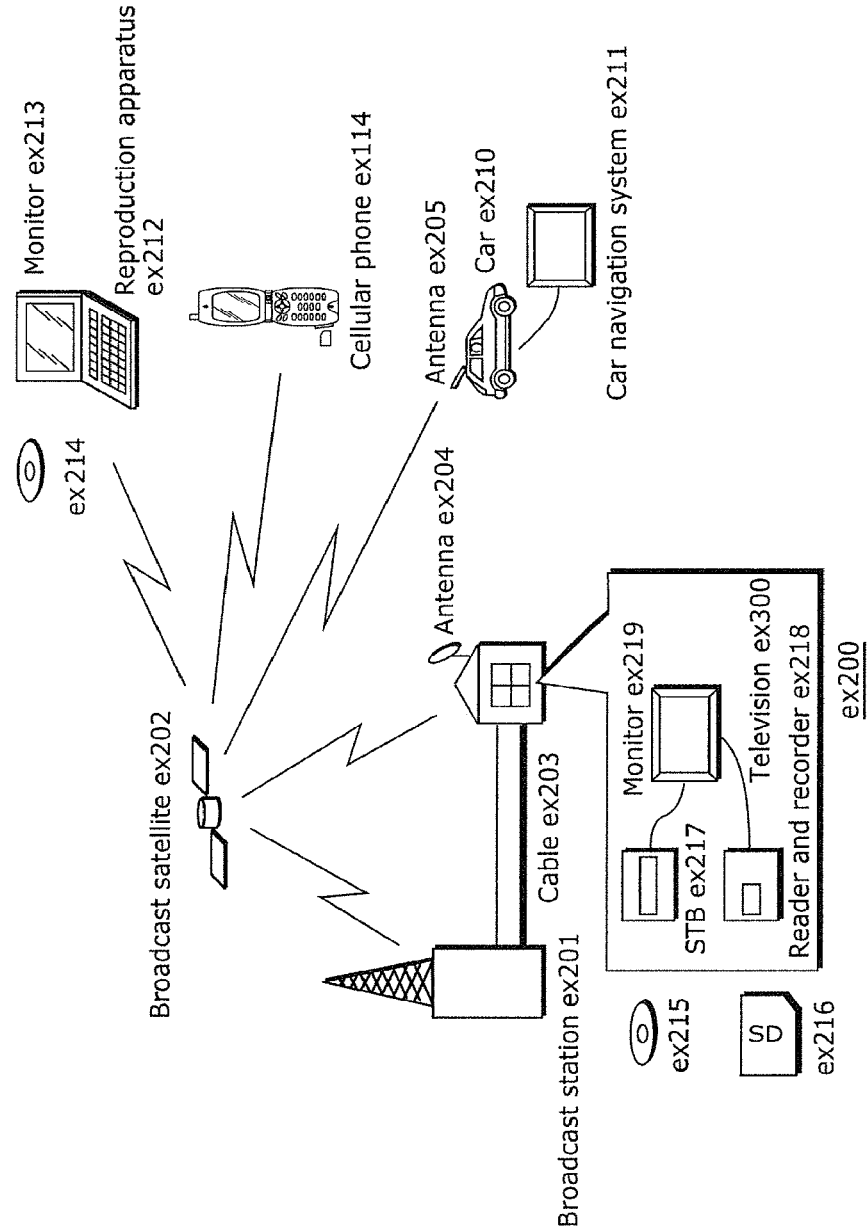
FIG. 16 shows an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 16. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present invention). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present invention).

Furthermore, a reader/recorder ex218 (*i*) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 17:
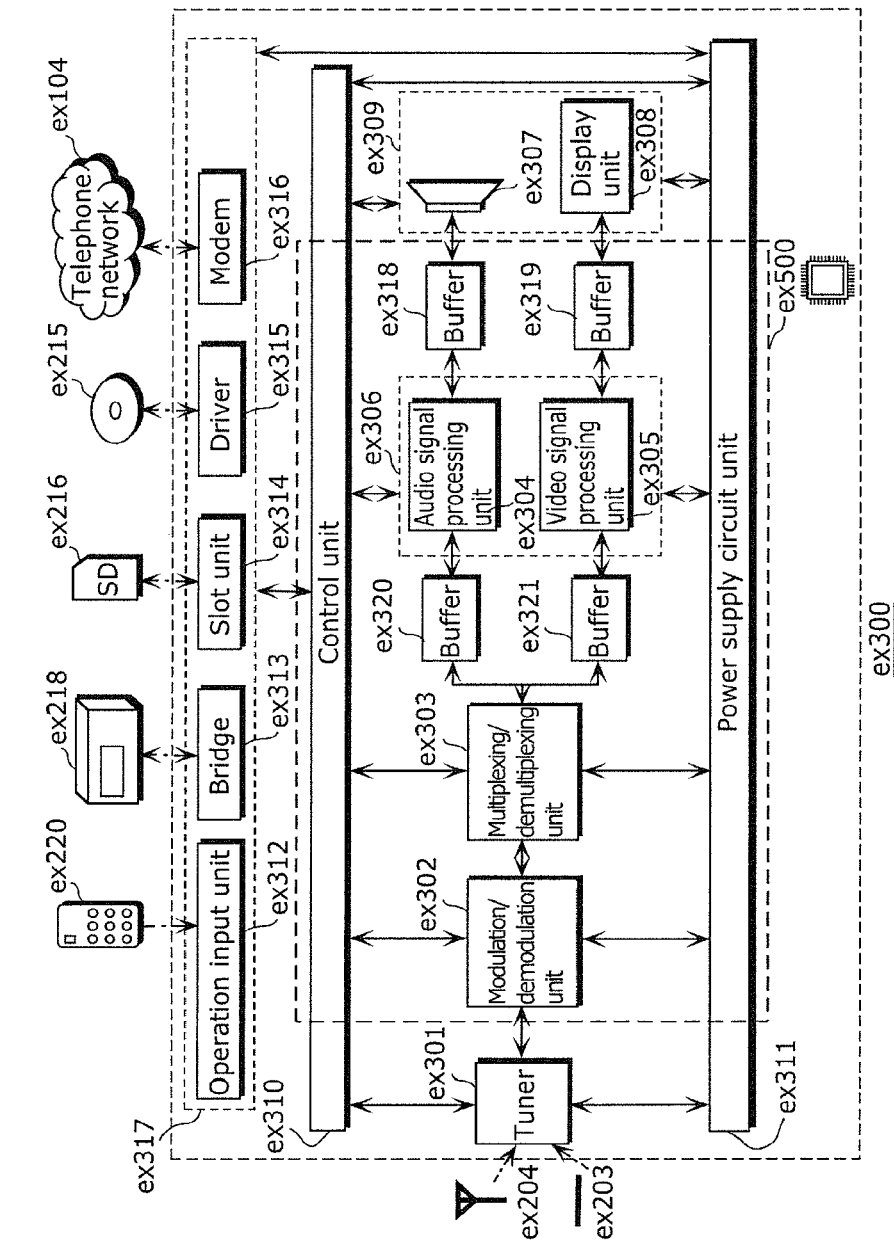
FIG. 17 shows a block diagram illustrating an example of a configuration of a television.

FIG. 17 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present invention); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 18:
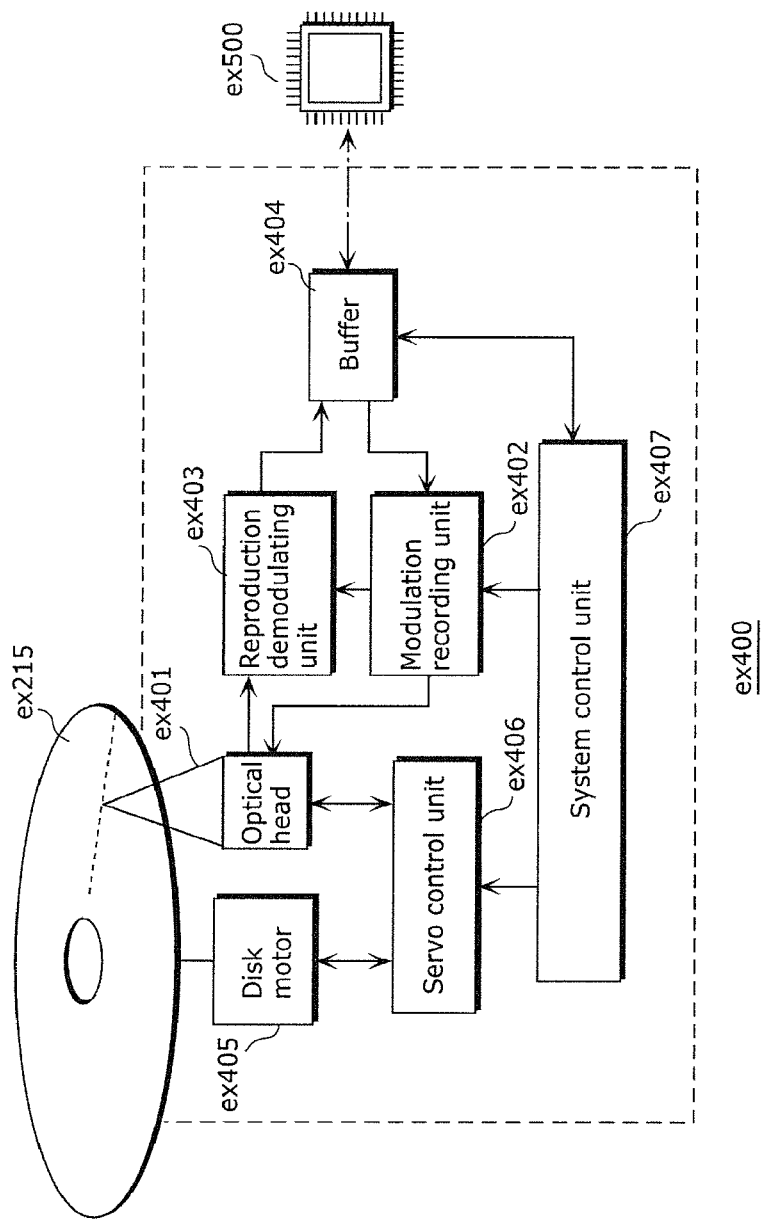
FIG. 18 shows a block diagram illustrating an example of a configuration of an information reproducing/recording unit that reads and writes information from and on a recording medium that is an optical disk.

As an example, FIG. 18 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

FIG. 19 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 17. The same will be true for the configuration of the computer ex111, the cellular phone ex114, and others.

FIG. 20A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Next, an example of a configuration of the cellular phone ex114 will be described with reference to FIG. 20B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present invention), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present invention), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Embodiment 5

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

FIG. 21 illustrates a structure of the multiplexed data. As illustrated in FIG. 21, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 22:
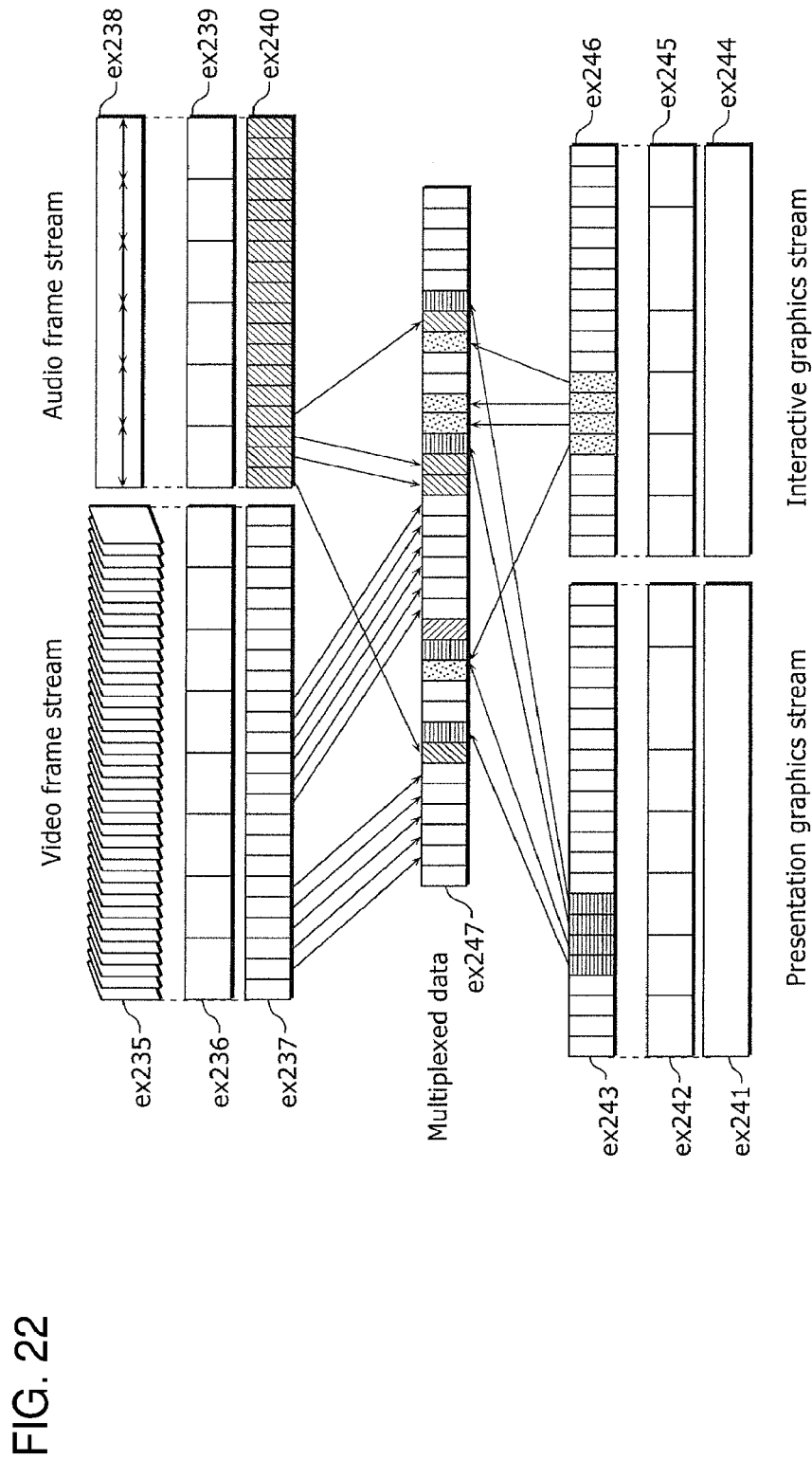
FIG. 22 schematically shows how each stream is multiplexed in multiplexed data.

FIG. 22 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 23:
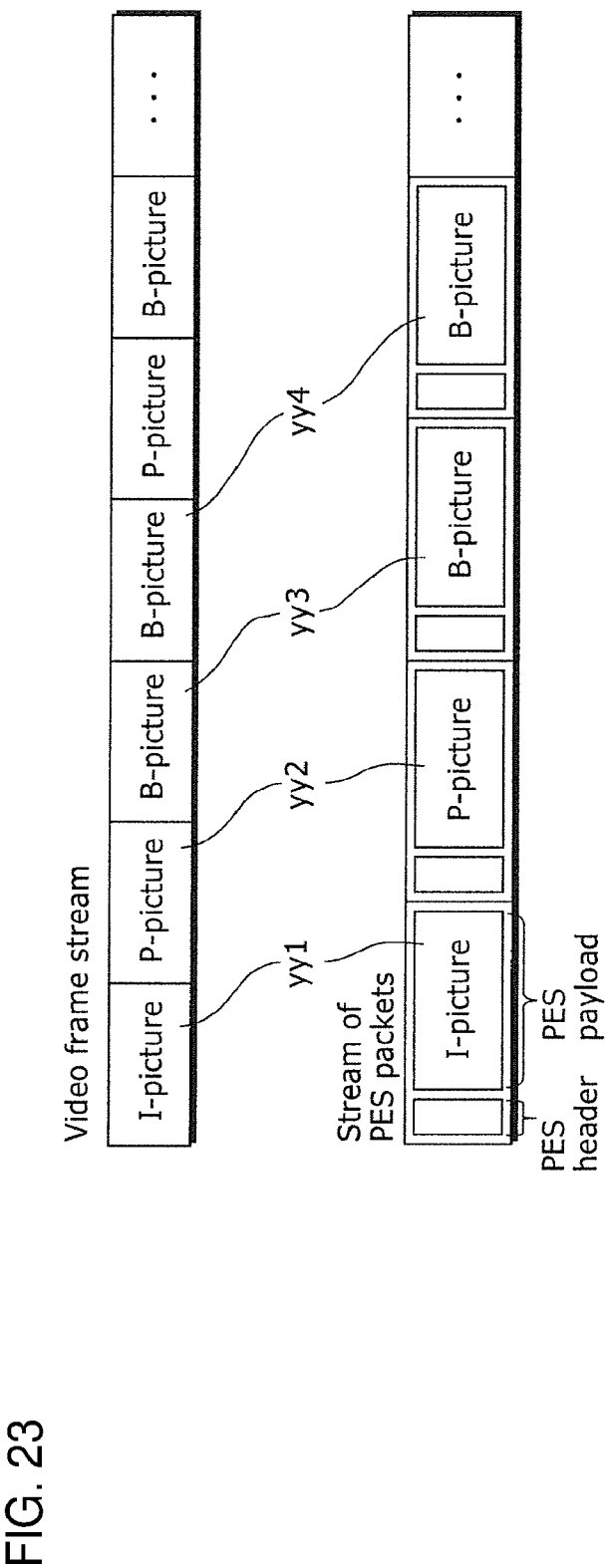
FIG. 23 shows how a video stream is stored in a stream of PES packets in more detail.

FIG. 23 illustrates how a video stream is stored in a stream of PES packets in more detail. The first bar in FIG. 23 shows a video frame stream in a video stream. The second bar shows the stream of PES packets. As indicated by arrows denoted as yy1, yy2, yy3, and yy4 in FIG. 23, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 24 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 24. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

FIG. 25 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Each of the multiplexed data information files is management information of the multiplexed data as shown in FIG. 26. The multiplexed data information files are in one to one correspondence with the multiplexed data, and each of the files includes multiplexed data information, stream attribute information, and an entry map.

As illustrated in FIG. 26, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

As shown in FIG. 27, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 28:
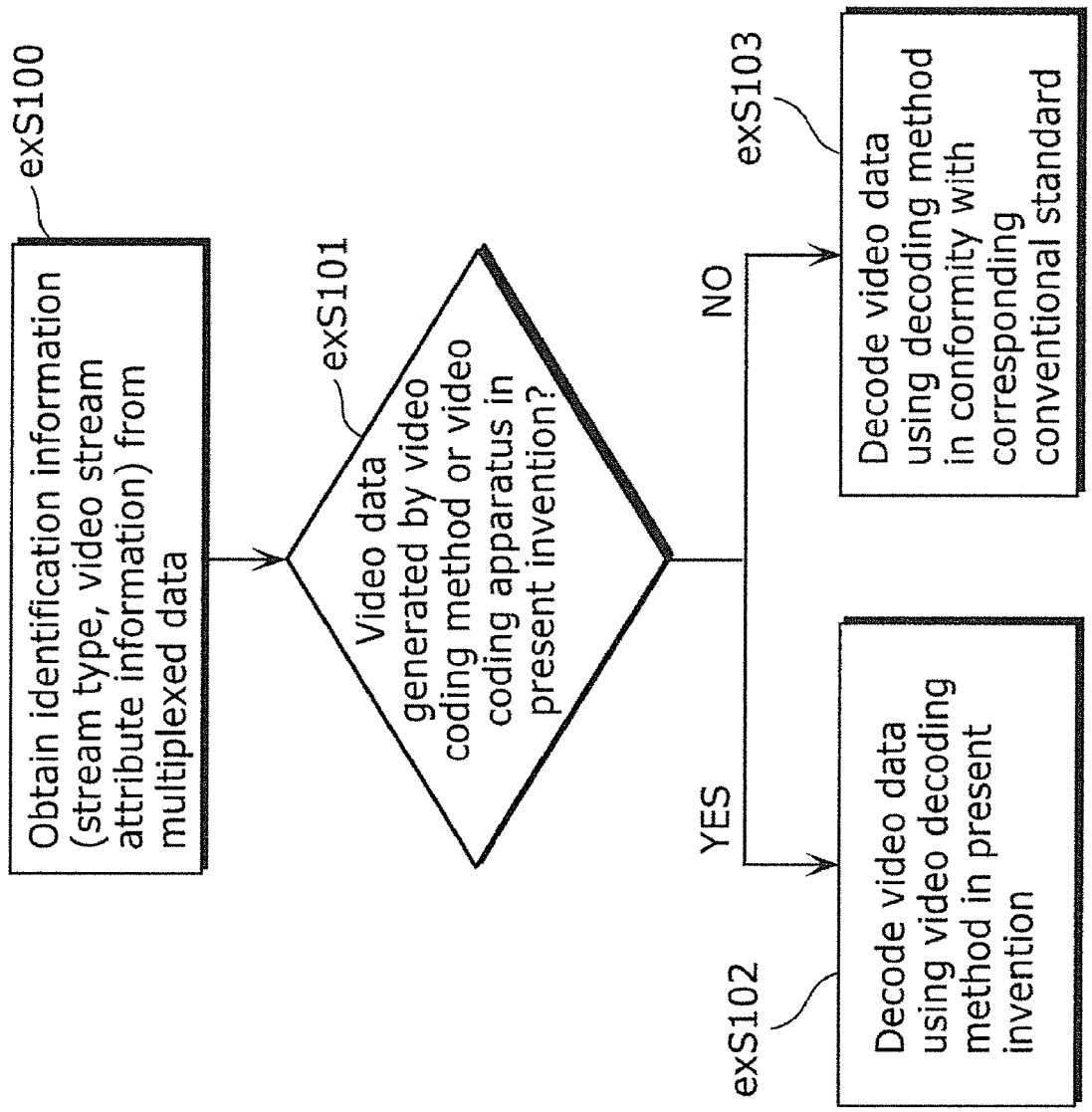
FIG. 28 shows steps for identifying video data.

Furthermore, FIG. 28 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 6

Figure 29:
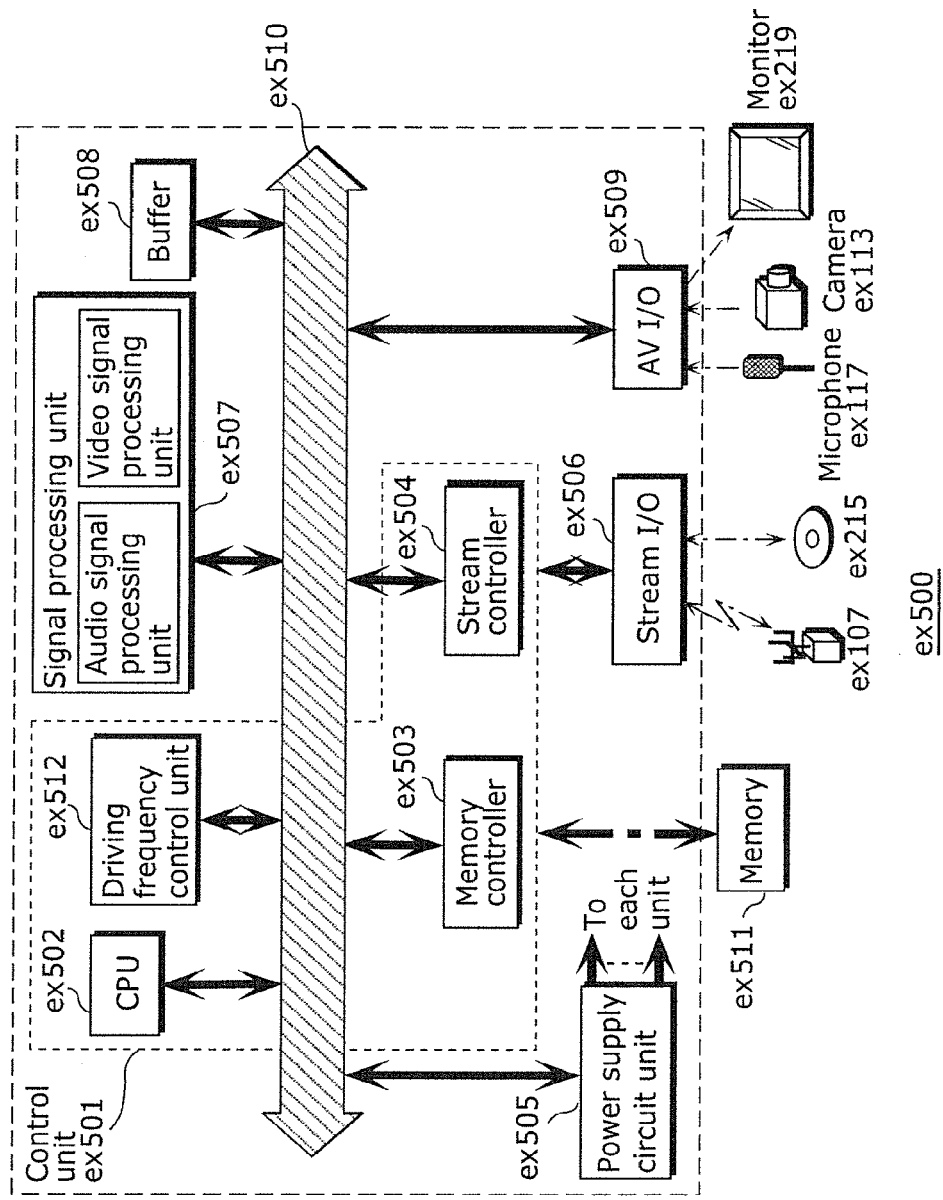
FIG. 29 shows an example of a configuration of an integrated circuit for implementing the moving picture coding method and the moving picture decoding method according to each of embodiments.

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 29 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips. Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment 7

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 30:
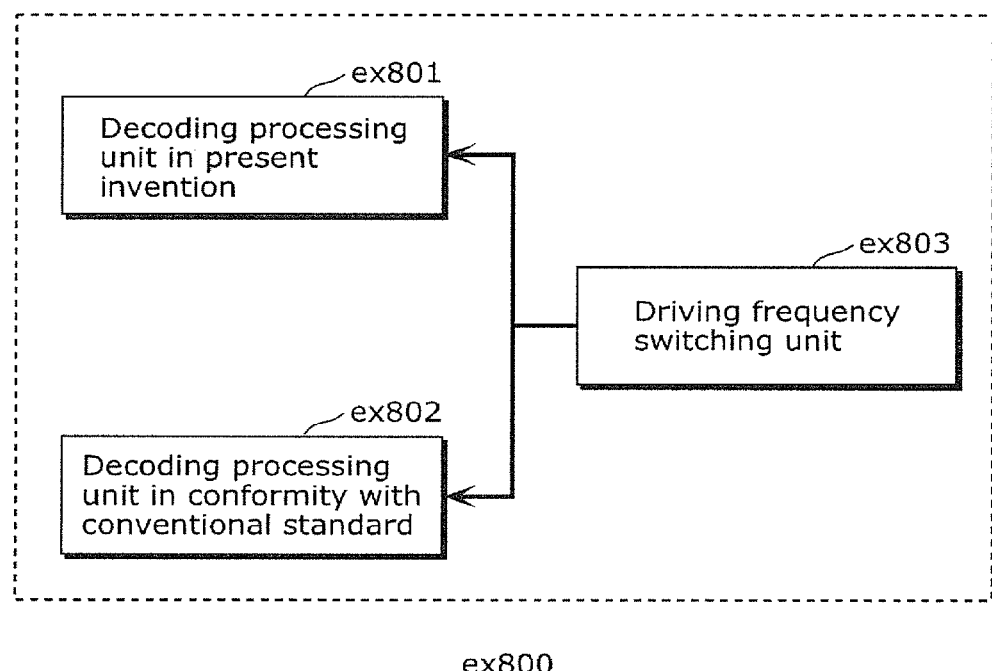
FIG. 30 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 30 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 29. Here, each of the decoding processing unit ex801 that executes the moving picture decoding method described in each of embodiments and the decoding processing unit ex802 that conforms to the conventional standard corresponds to the signal processing unit ex507 in FIG. 29. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 5 is probably used for identifying the video data. The identification information is not limited to the one described in Embodiment 5 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 32. The driving frequency can be selected by storing the look-up table in the buffer ex508 and in an internal memory of an LSI, and with reference to the look-up table by the CPU ex502.

Figure 31:
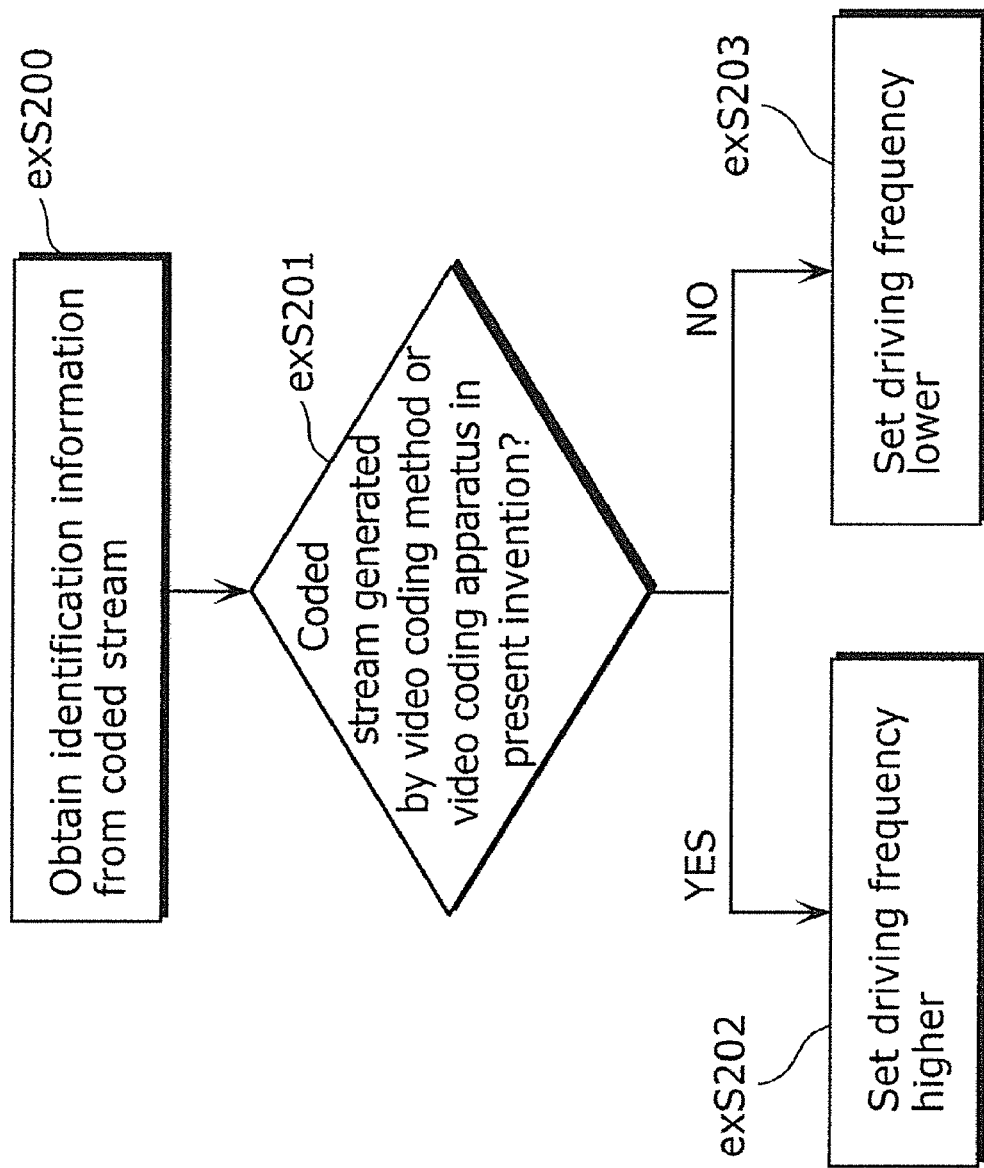
FIG. 31 shows steps for identifying video data and switching between driving frequencies.

FIG. 31 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 8

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 33A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present invention. Since the aspect of the present invention is characterized by inverse quantization in particular, for example, the dedicated decoding processing unit ex901 is used for inverse quantization. Otherwise, the decoding processing unit is probably shared for one of the entropy decoding, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Furthermore, ex1000 in FIG. 33B shows another example in that processing is partly shared. This example uses a configuration including a dedicated decoding processing unit ex1001 that supports the processing unique to an aspect of the present invention, a dedicated decoding processing unit ex1002 that supports the processing unique to another conventional standard, and a decoding processing unit ex1003 that supports processing to be shared between the moving picture decoding method according to the aspect of the present invention and the conventional moving picture decoding method. Here, the dedicated decoding processing units ex1001 and ex1002 are not necessarily specialized for the processing according to the aspect of the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present invention and the moving picture decoding method in conformity with the conventional standard.

Although the image coding apparatus and the image decoding apparatus according to one or more aspects of the inventive concepts have been described above, the herein disclosed subject matter is to be considered descriptive and illustrative only. Those skilled in the art will readily appreciate that the appended Claims are of a scope intended to cover and encompass not only the particular embodiments disclosed, but also equivalent structures, methods, and/or uses which are obtained by making various modifications in the embodiments and by arbitrarily combining the structural elements in different embodiments, without materially departing from the principles and spirit of the inventive concept.

INDUSTRIAL APPLICABILITY

One or more exemplary embodiments disclosed herein are applicable to image coding methods, image decoding methods, image coding apparatuses, and image decoding apparatuses. The image coding method, the image decoding method, the image coding apparatus, and the image decoding apparatus consistent with one or more exemplary embodiments of the present disclosure can be used for information display devices and imaging devices with high resolution which include televisions, digital video recorders, car navigation systems, cellular phones, digital cameras, and digital video cameras.

REFERENCE SIGNS LIST

200 Video encoding apparatus
201 Transformation unit
202 Quantization unit
203 Inverse quantization unit
204 Inverse transformation unit
205 Block memory
206 Frame memory
207 Intra prediction unit
208 Inter prediction unit
209 Entropy coding unit
210 Frame memory control unit
300 Video decoding apparatus
301 Entropy decoding unit
302 Inverse quantization unit
303 Inverse transformation unit
304 Block memory
305 Frame memory
306 Intra prediction unit
307 Inter prediction unit
308 Frame memory control unit

The invention claimed is:

1. A control circuitry executes operations, the operations including:

parsing a plurality of buffer descriptions from a sequence parameter set of a coded video bitstream;

parsing (i) a buffer description identifier which indicates a buffer description out of the plurality of buffer descriptions, (ii) a plurality of buffer element identifiers, each of the plurality of buffer element identifiers indicating each of a plurality of buffer elements within the buffer description indicated by the buffer description identifier, each of the plurality of buffer elements corresponding to each of a plurality of reference pictures and (iii) a plurality of picture identifiers, each of the plurality of picture identifiers for reassigning each of the plurality of reference pictures to be associated with each of the plurality of buffer elements within the buffer description indicated by the buffer description identifier;

selecting one buffer description indicated by the buffer description identifier from the plurality of buffer descriptions for decoding a slice included in the coded video bitstream;

parsing, from a picture parameter set, a flag which indicates whether reassigning the plurality of reference pictures to be associated with each of the plurality of buffer elements within the selected one buffer description is to be executed or not;

reassigning, using the plurality of picture identifiers, the plurality of reference pictures to be associated with each of the plurality of buffer elements within the selected one buffer description, all the plurality of reference pictures existing in the selected one buffer description when the flag indicates the reassigning is to be executed;

decoding the slice from the coded video bitstream using a slice header and the selected one buffer description which is reassigned when the flag indicates that the reassigning is to be executed;

not reassigning the plurality of reference pictures to be associated with each of the plurality of buffer elements within the selected one buffer description when the flag indicates that the reassigning is not to be executed; and decoding the slice using the slice header and the selected one buffer description which is not reassigned when the reassigning is not to be executed.

\* \* \* \* \*